(12) United States Patent
Weichmann et al.

(10) Patent No.: US 8,535,436 B2
(45) Date of Patent: *Sep. 17, 2013

(54) USE OF CYCLOHEXANE POLYCARBOXYLIC ACID DERIVATIVES FOR REMOVING DUST FROM CHEMICAL CONSTRUCTION PRODUCTS

(75) Inventors: Josef Weichmann, Pleiskirchen (DE); Werner Stohr, Augsburg (DE); Volker Schwarz, Augsburg (DE); Klaus-Dieter Hoetzl, Augsburg (DE); Boris Breitscheidel, Limburgerhof (DE)

(73) Assignee: Construction Research & Technology GmbH, Trostberg (DE)

( * ) Notice: Subject to any disclaimer, the term of this patent is extended or adjusted under 35 U.S.C. 154(b) by 80 days.

This patent is subject to a terminal disclaimer.

(21) Appl. No.: 13/062,994

(22) PCT Filed: May 28, 2009

(86) PCT No.: PCT/EP2009/056514
§ 371 (c)(1),
(2), (4) Date: May 16, 2011

(87) PCT Pub. No.: WO2010/028870
PCT Pub. Date: Mar. 18, 2010

(65) Prior Publication Data
US 2011/0209644 A1 Sep. 1, 2011

(30) Foreign Application Priority Data

Sep. 10, 2008 (EP) .................................. 08164017

(51) Int. Cl.
*C04B 24/04* (2006.01)
(52) U.S. Cl.
USPC .......................................... 106/724; 106/728
(58) Field of Classification Search
USPC ................................. 106/724, 728
See application file for complete search history.

(56) References Cited

U.S. PATENT DOCUMENTS

| | | | | |
|---|---|---|---|---|
| 2,275,385 A | * | 3/1942 | Soday | 560/127 |
| 4,055,439 A | * | 10/1977 | Babler et al. | 106/410 |
| 4,115,143 A | * | 9/1978 | Batzar | 106/433 |
| 4,235,597 A | * | 11/1980 | Reinert | 8/526 |
| 4,277,288 A | * | 7/1981 | Lawrence et al. | 106/413 |
| 4,310,483 A | * | 1/1982 | Dorfel et al. | 264/117 |
| 4,373,964 A | * | 2/1983 | Linden et al. | 106/505 |
| 4,545,820 A | | 10/1985 | Mallow | |
| 4,756,759 A | * | 7/1988 | Amon et al. | 106/31.65 |
| 4,780,143 A | | 10/1988 | Roe | |
| 4,786,328 A | * | 11/1988 | Weill et al. | 106/691 |
| 4,814,020 A | * | 3/1989 | Kieser et al. | 106/499 |
| 4,986,853 A | * | 1/1991 | Kieser | 106/504 |
| 5,034,508 A | * | 7/1991 | Nishizaki et al. | 528/408 |
| 5,228,912 A | * | 7/1993 | Herget et al. | 106/505 |
| 6,133,347 A | * | 10/2000 | Vickers et al. | 524/8 |
| 6,214,963 B1 | * | 4/2001 | Noguchi et al. | 528/71 |
| 6,451,881 B1 | * | 9/2002 | Vickers et al. | 524/8 |
| 6,468,632 B2 | * | 10/2002 | Winkowski | 428/192 |
| 6,492,461 B1 | * | 12/2002 | Vickers et al. | 525/54.2 |
| 6,861,459 B2 | * | 3/2005 | Vickers et al. | 524/5 |
| 6,908,955 B2 | * | 6/2005 | Porsch et al. | 524/5 |
| 2003/0144385 A1 | * | 7/2003 | Vickers et al. | 524/2 |
| 2003/0181579 A1 | * | 9/2003 | Porsch et al. | 525/54.2 |
| 2007/0056473 A1 | * | 3/2007 | Nakashima et al. | 106/627 |
| 2008/0039646 A1 | | 2/2008 | Storzum et al. | |
| 2009/0029173 A1 | * | 1/2009 | Schramm et al. | 428/413 |
| 2011/0265693 A1 | * | 11/2011 | Hoetzl et al. | 106/778 |

FOREIGN PATENT DOCUMENTS

| | | |
|---|---|---|
| BR | 2008001269 A2 * | 11/2008 |
| DE | 20 2006 016 797 U1 | 2/2007 |
| EP | 0 100 656 A2 | 2/1984 |
| EP | 0 352 583 A2 | 1/1990 |
| EP | 0 403 874 A1 | 12/1990 |
| EP | 1897927 * | 3/2008 |
| GB | 1 419 833 | 12/1975 |
| JP | 61282305 * | 12/1986 |
| WO | WO 2005/123821 A2 | 12/2005 |
| WO | WO 2006/084588 A2 | 8/2006 |

OTHER PUBLICATIONS

BR 2008001269 A2 (Nov. 25, 2008) Cintra et al., abstract only. Answer 5 of 24 on p. 16 of Search Report.*
EP 1897927 A2 (Mar. 12, 2008) Koyanagi et al., abstract only. Answer 10 of 24 on p. 29 of Search Report.*
US 20030181579 Porsch et al. Sep. 25, 2003, abstract only. Answer 14 of 24 on p. 37 of Search Report.*
"Effect of chemical admixtures on CH crystal growth", Rosenthal et al., Proceedings of Int'l Congress on Chemistry of Cement, 10th, Gothenburg, Jun. 2-6, 1997, vol. 3, 5 pages. Abstract only (See Answer 21 of 24 of Search Report).*
JP 61282305 (Dec. 12, 1986) Fujita, abstract only.*
International Preliminary Report on Patentability, Form PCT/IB/373 issued Mar. 15, 2011, for corresponding PCT International Patent Application No. PCT/EP2009/056514.
International Search Report, Form PCT/ISA/210, mailed Mar. 2, 2010, for corresponding PCT International Patent Application No. PCT/EP2009/056514.
Written Opinion of the International Searching Authority, Form PCT/ISA/237, mailed Mar. 2, 2010, for corresponding PCT International Patent Application No. PCT/EP2009/056514.

\* cited by examiner

*Primary Examiner* — Paul Marcantoni
(74) *Attorney, Agent, or Firm* — Curatolo Sidoti Co., LPA; Joseph G. Curatolo; Salvatore A. Sidoti

(57) ABSTRACT

The use of cyclohexanepolycarboxylic acid derivatives for reducing or minimizing the dust emission when handling pulverulent construction chemistry products, processes for the preparation of the pulverulent construction chemistry products and hydraulically setting materials containing the cyclohexanepolycarboxylic acid derivatives according to the invention are proposed.

20 Claims, No Drawings

USE OF CYCLOHEXANE POLYCARBOXYLIC ACID DERIVATIVES FOR REMOVING DUST FROM CHEMICAL CONSTRUCTION PRODUCTS

CROSS REFERENCE TO RELATED APPLICATIONS

This application is a national stage application of International Application No. PCT/EP2009/056514, filed 28 May 2009, which claims priority from European Patent Application Serial No. 08164017.9, filed 10 Sep. 2008, from which applications priority is claimed, and which are incorporated herein by reference.

The present invention relates to the use of cyclohexanepolycarboxylic acid derivatives for reducing or minimizing the dust emission when handling pulverulent construction chemistry products, a process for the preparation of the pulverulent construction chemistry products, and hydraulically setting materials containing the cyclohexanepolycarboxylc acid derivatives according to the invention.

Dry, in particular pulverulent construction chemistry products, such as hydraulically setting or cement-containing materials (e.g. tile adhesive, grouts, filling compounds, sealing slurries, etc.) lead to substantial dust formation during transfer and mixing processes, owing to their fine and very fine particle fractions. Numerous attempts have therefore been made to reduce or to suppress the dust development in such products.

For example, attempts were made to reduce the dust development in the case of hydraulically setting materials, for example filling compounds, via the degree of grinding or the particle size distribution of the pulverulent products, where the workability of coarser powders is worse.

A further method for reducing the dust development is aggregation, for example with water, aqueous solutions or dispersions. Thus, for example, U.S. Pat. No. 4,780,143 discloses the addition of aqueous foam to cement clinker, prior it is grinded to cement, for reducing the dust development. Additions of polymer dispersions to cement for air-placed concrete compositions have also already been proposed for reducing the dust formation. Temporary aggregation in the case of hydraulically setting materials is unimportant only when the products are subsequently ground or are intended to be used, for example, as air-place concrete or pneumatically applied mortar. However, relatively coarse aggregates are not acceptable, for example, in levelling screeds on which floor coverings are applicated, since they would give a not acceptable rough surface optic in combination with many smooth floor covering materials.

In EP 403 874 A1, specific ethylene oxide/propylene oxide block copolymers are mentioned as additives for dust reduction. However, a disadvantage of these additives is that often large amounts thereof have to be used for achieving a significant effect.

WO 2006/084588 A1 discloses the use of highly viscous, linear hydrocarbons or hydrocarbon mixtures as additives for reducing the dusting of pulverulent construction chemistry products. A disadvantage of the systems described herein is the high viscosity of the hydrocarbons used, which also result in a high consumption and hence a low efficiency of the used additives.

The Utility Model DE 20 2006 016 797 U1 relates to a low-dust dry mortar which contains at least one dust-reducing component in an amount of 0.01 to 10% by weight, based on the total dry mixture. The dust-reducing component is selected from the series consisting of the monoalcohols, such as, for example, 3-methoxybutanol, benzyl alcohol, 1,2-propanediol, hexanol, diacetone alcohol, ethyldiglycol, isopropanol, 2-ethylhexanol, and/or alkanediols, such as 2-methylpentane-2,4-diol, neopentylglycol and n-butane-2,5-diol. Glycols, polyethylene glycols, fatty alcohols and polyvinyl alcohols are furthermore suitable. Aliphatic ethers, cellulose ethers, alkoxylates and methyl/ethyl fatty acid ethers are mentioned in particular.

Since the fundamental problem of the dusting of construction chemistry mixtures still has not been finally eliminated with said compounds or processes, especially from economic points of view, it was the object of the present invention to provide additives for dust reduction which are advantageously suitable as dedusting agents for pulverulent construction chemistry products and which are distinguished by easy application and high efficiency. In addition, they should not tend to form lumps during use and should not adversely affect the performance of the hardened systems.

According to the invention, the object was achieved by the use of cyclohexanepolycarboxylic acid derivatives of the formula (I)

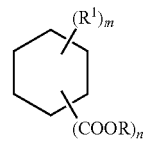

in which
$R^1$ represents $C_1$-$C_{10}$-alkyl or $C_3$-$C_8$-cycloalkyl,
m represents 0, 1, 2 or 3,
n represents 2, 3 or 4 and
R represents hydrogen or $C_1$-$C_{10}$-alkyl, $C_1$-$C_{30}$-alkoxy or $C_3$-$C_8$-cycloalkyl, at least one radical R representing $C_1$-$C_{30}$-alkyl, $C_1$-$C_{30}$-alkoxy or $C_3$-$C_8$-cycloalkyl, as an additive for dedusting pulverulent construction chemistry products.

The present invention therefore relates to the use of the cyclohexanepolycarboxylic acid derivatives according to the invention as additives for reducing or minimizing the dust emission during the handling of pulverulent construction chemistry products, comprising organic and/or mineral constituents, a process for the preparation of the pulverulent construction chemistry products, and pulverulent construction chemistry products containing the cyclohexanepolycarboxylic acid derivatives according to the invention.

In the formula (I), the radicals $R^1$ may be identical or different if m is 2 or 3. The $C_1$-$C_{10}$-alkyl groups may be straight-chain or branched. If $R^1$ represents an alkyl group, it is preferably a $C_1$-$C_8$-alkyl group, particularly preferably a $C_1$-$C_6$-alkyl group. Examples of such alkyl groups are methyl, ethyl, n-propyl, isopropyl, n-butyl, isobutyl, sec-butyl, tert-butyl, n-pentyl, n-hexyl, n-octyl and 2-ethylhexyl. Preferably, m is 0.

The m radicals R may be identical or different. The $C_1$-$C_{30}$-alkyl groups and the alkyl radicals of the $C_1$-$C_{30}$-alkoxy groups may be straight-chain or branched. R is preferably $C_1$-$C_{30}$-alkyl, $C_1$-$C_{20}$-alkyl, particularly preferably $C_1$-$C_{18}$-alkyl, very particularly preferably $C_1$-$C_{13}$-alkyl. Examples of such alkyl groups are the alkyl groups already mentioned for $R^1$, and n-nonyl, isononyl, n-decyl, isodecyl, n-undecyl, isoundecyl, n-dodecyl, isododecyl, n-tridecyl, isotridecyl, stearyl and n-eicosyl.

The alkyl groups may be in each case individual isomers of said alkyl groups or mixtures of different alkyl groups. The different alkyl groups may be different isomers having the same number of carbon atoms and/or alkyl groups which have a different number of carbon atoms.

The pulverulent construction chemistry products contain organic and/or mineral constituents.

Pulverulent construction chemistry products comprising organic and/or mineral constituents may be, for example, tile adhesive, sealing slurry, reinforcing adhesive, composite heat insulation system (CHIS) adhesives, mineral renders, repair mortars, self-levelling filling compound, fine fillers, screed systems, thick-bed mortars, joint mortars or surface protection systems, but also pigment formulations.

The organic constituents of the construction chemistry products are understood as meaning, for example, redispersible polymer powders, thickeners, stabilizers, antifoams, dispersants, emulsifiers or pigments.

The mineral constituents may be, for example, cement, gypsum, anhydrite, lime, chalk, sand, quartz powder, clay, ash, slag, microsilica, light fillers, such as expanded glass, expanded clay, Poraven®, Expancell® and pigments.

The invention furthermore relates to the use of the cyclohexanepolycarboxylic acid derivatives according to the invention as additives for dedusting pulverulent polymers or polymer powders and redispersible polymer powders as shown below:

| Redispersible polymer powder | Polymers | Polymer powders |
| --- | --- | --- |
| VAc/E/Veova | starches | PVC (polyvinyl chloride) |
| S/Acrylate | celluloses | phenol resin binders |
| S/B | gums | vinurans |
| UF/MF | | Kaurit resins |
| Pure acrylates | | |

VAc = vinyl acetate
S = styrene
B = butadiene
E = ethylene
Veova = vinyl ester of versatic acid
UF = urea-formaldehyde
MF = melamine-formaldehyde The cyclohexanepolycarboxylic acid derivatives used according to the invention are in particular mono-, di-, tri- and tetraesters and anyhdrides of the cyclohexanepolycarboxylic acids. Preferably, all carboxyl groups are present in esterified form. The esters used are alkyl, cycloalkyl and alkoxyalkyl esters, preferably alkyl esters, preferred alkyl groups R already having been mentioned above.

The at least one cyclohexanepolycarboxylic acid derivative is preferably selected from the group consisting of mono- and dialkyl esters of phthalic acid, isophthalic acid and terephthalic acid, which esters are hydrogenated on the nucleus, mono-, di- and trialkyl esters of trimellitic acid, which esters are hydrogenated on the nucleus, trimesic acid and hemimellitic acid or mono-, di-, tri- and tetraalkyl esters of pyromellitic acid, where the alkyl groups R may be linear or branched and have in each case 1 to 30, preferably 1 to 20, particularly preferably 1 to 18, very particularly preferably 1 to 13, carbon atoms, and mixtures of two or more thereof. Suitable alkyl groups R have already been mentioned above.

Alkyl cyclohexane-1,4-dicarboxylates, such as, for example, monomethyl cyclohexane-1,4-dicarboxylate, dimethyl cyclohexane-1,4-dicarboxylate, diethyl cyclohexane-1,4-dicarboxylate, di-n-propyl cyclohexane-1,4-dicarboxylate, di-n-butyl cyclohexane-1,4-dicarboxylate, di-tert-butyl cyclohexane-1,4-dicarboxylate, diisobutyl cyclohexane-1,4-dicarboxylate, monoglycol cyclohexane-1,4-dicarboxylate, diglycol cyclohexane-1,4-dicarboxylate, di-n-octyl cyclohexane-1,4-dicarboxylate, diisooctyl cyclohexane-1,4-dicarboxylate, mono-2-ethylhexyl cyclohexane-1,4-dicarboxylate, di-2-ethylhexyl cyclohexane-1,4-dicarboxylate, di-n-nonyl cyclohexane-1,4-dicarboxylate, diisononyl cyclohexane-1,4-dicarboxylate, di-n-decyl cyclohexane-1,4-dicarboxylate, di-n-undecyl cyclohexane-1,4-dicarboxylate, diisodecyl cyclohexane-1,4-dicarboxylate, diisododecyl cyclohexane-1,4-dicarboxylate, di-n-octadecyl cyclohexane-1,4-dicarboxylate, diisooctadecyl cyclohexane-1,4-dicarboxylate, di-n-eicosyl cyclohexane-1,4-dicarboxylate, monocyclohexyl cyclohexane-1,4-dicarboxylate, dicyclohexyl cyclohexane-1,4-dicarboxylate;

diisopropyl cyclohexane-1,4-dicarboxylate, di-n-hexyl cyclohexane-1,4-dicarboxylate, diisohexyl cyclohexane-1,4-dicarboxylate, di-n-heptyl cyclohexane-1,4-dicarboxylate, diisoheptyl cyclohexane-1,4-dicarboxylate, di-2-propylheptyl cyclohexane-1,4-dicarboxylate, diisoundecyl cyclohexane-1,4-dicarboxylate, di-n-dodecyl cyclohexane-1,4-dicarboxylate, di-n-tridecyl cyclohexane-1,4-dicarboxylate, diisotridecyl cyclohexane-1,4-dicarboxylate, di-n-pentyl cyclohexane-1,4-dicarboxylate, diisopentyl cyclohexane-1,4-dicarboxylate;

diisopropyl cyclohexane-1,2-dicarboxylate, di-n-hexyl cyclohexane-1,2-dicarboxylate, diisohexyl cyclohexane-1,2-dicarboxylate, di-n-heptyl cyclohexane-1,2-dicarboxylate, diisoheptyl cyclohexane-1,2-dicarboxylate, di-2-propylheptyl cyclohexane-1,2-dicarboxylate, diisoundecyl cyclohexane-1,2-dicarboxylate, di-n-dodecyl cyclohexane-1,2-dicarboxylate, di-n-tridecyl cyclohexane-1,2-dicarboxylate, diisotridecyl cyclohexane-1,2-dicarboxylate, di-n-pentyl cyclohexane-1,2-dicarboxylate, diisopentyl cyclohexane-1,2-dicarboxylate;

alkyl cyclohexane-1,2-dicarboxylates, such as, for example, monomethyl cyclohexane-1,2-dicarboxylate, dimethyl cyclohexane-1,2-dicarboxylate, diethyl cyclohexane-1,2-dicarboxylate, di-n-propyl cyclohexane-1,2-dicarboxylate, di-n-butyl cyclohexane-1,2-dicarboxylate, di-tert-butyl cyclohexane-1,2-dicarboxylate, diisobutyl cyclohexane-1,2-dicarboxylate, monoglycol cyclohexane-1,2-dicarboxylate, diglycol cyclohexane-1,2-dicarboxylate, di-n-octyl cyclohexane-1,2-dicarboxylate, diisooctyl cyclohexane-1,2-dicarboxylate, di-2-ethylhexyl cyclohexane-1,2-dicarboxylate, di-n-nonyl cyclohexane-1,2-dicarboxylate, diisononyl cyclohexane-1,2-dicarboxylate, di-n-decyl cyclohexane-1,2-dicarboxylate, diisodecyl cyclohexane-1,2-dicarboxylate, di-n-undecyl cyclohexane-1,2-dicarboxylate, diisododecyl cyclohexane-1,2-dicarboxylate, di-n-octadecyl cyclohexane-1,2-dicarboxylate, diisooctadecyl cyclohexane-1,2-dicarboxylate, di-n-eicosyl cyclohexane-1,2-dicarboxylate, monocyclohexyl cyclohexane-1,2-dicarboxylate, dicyclohexyl cyclohexane-1,2-dicarboxylate;

mixed esters of cyclohexane-1,2-dicarboxylic acid with $C_1$ to $C_{13}$-alcohols, such as, for example, ethyl methyl cyclohexane-1,2-dicarboxylate, n-propyl methyl cyclohexane-1,2-dicarboxylate, isopropyl methyl cyclohexane-1,2-dicarboxylate, n-butyl methyl cyclohexane-1,2-dicarboxylate, tert-butyl methyl cyclohexane-1,2-dicarboxylate, isobutyl methyl cyclohexane-1,2-dicarboxylate, glycol methyl cyclohexane-1,2-dicarboxylate, n-hexyl methyl cyclohexane-1,2-dicarboxylate, isohexyl methyl cyclohexane-1,2-dicarboxylate, n-heptyl methyl cyclohexane-1,2-dicarboxylate, isoheptyl methyl cyclohexane-1,2-dicarboxylate, n-octyl methyl cyclohexane-1,2-dicarboxylate, isooctyl methyl cyclohexane-1,2-dicarboxylate, 2-ethylhexyl methyl cyclohexane-1,2-dicarboxylate, n-nonyl methyl cyclohexane-1,2-dicarboxylate, isononyl methyl cyclohexane-1,2-dicarboxylate, 2-propylheptyl methyl cyclohexane-1,2-dicarboxylate, n-decyl methyl cyclohexane-1,2-dicarboxylate, isodecyl methyl cyclohexane-1,2-dicarboxylate, n-undecyl methyl cyclohexane-1,2-dicarboxylate, isoundecyl methyl cyclohexane-1,2-dicarboxylate, n-dodecyl methyl cyclohexane-1,2-dicarboxylate, isododecyl methyl cyclohexane-1,2-dicarboxylate, n-tridecyl methyl cyclohexane-1,2-dicarboxylate, isotridecyl methyl cyclohexane-1,2-dicarboxylate, n-propyl ethyl cyclohexane-1,2-dicarboxylate, isopropyl ethyl cyclohexane-1,2-dicarboxylate, n-butyl ethyl cyclohexane-1,2-dicarboxylate, tert-butyl ethyl cyclohexane-1,2-dicarboxylate, isobutyl ethyl cyclohexane-1,2-dicarboxylate, glycol ethyl cyclohexane-1,2-dicarboxylate, n-hexyl ethyl cyclohexane-1,2-dicarboxylate, isohexyl ethyl cyclohexane-1,2-dicarboxylate, n-heptyl ethyl cyclohexane-1,2-dicarboxylate, isoheptyl ethyl cyclohexane-1,2-dicarboxylate, n-octyl ethyl cyclohexane-1,2-dicarboxylate, isooctyl ethyl cyclohexane-1,2-dicarboxylate, 2-ethylhexyl ethyl cyclohexane-1,2-dicarboxylate, n-nonyl ethyl cyclohexane-1,2-dicarboxylate, isononyl ethyl cyclohexane-1,2-dicarboxylate, 2-propylheptyl ethyl cyclohexane-1,2-dicarboxylate, n-decyl ethyl cyclohexane-1,2-dicarboxylate, isodecyl ethyl cyclohexane-1,2-dicarboxylate, n-undecyl ethyl cyclohexane-1,2-dicarboxylate, isoundecyl ethyl cyclohexane-1,2-dicarboxylate, n-dodecyl ethyl cyclohexane-1,2-dicarboxylate, isododecyl ethyl cyclohexane-1,2-dicarboxylate, n-tridecyl ethyl cyclohexane-1,2-dicarboxylate, isotridecyl ethyl cyclohexane-1,2-dicarboxylate, isopropyl n-propyl cyclohexane-1,2-dicarboxylate, n-butyl n-propyl cyclohexane-1,2-dicarboxylate, tert-butyl n-propyl cyclohexane-1,2-dicarboxylate, isobutyl n-propyl cyclohexane-1,2-dicarboxylate, glycol n-propyl cyclohexane-1,2-dicarboxylate, n-hexyl n-propyl cyclohexane-1,2-dicarboxylate, isohexyl n-propyl cyclohexane-1,2-dicarboxylate, n-heptyl n-propyl cyclohexane-1,2-dicarboxylate, isoheptyl n-propyl cyclohexane-1,2-dicarboxylate, n-octyl n-propyl cyclohexane-1,2-dicarboxylate, isooctyl n-propyl cyclohexane-1,2-dicarboxylate, 2-ethylhexyl n-propyl cyclohexane-1,2-dicarboxylate, n-nonyl n-propyl cyclohexane-1,2-dicarboxylate, isononyl n-propyl cyclohexane-1,2-dicarboxylate, 2-propylheptyl n-propyl cyclohexane-1,2-dicarboxylate, n-decyl n-propyl cyclohexane-1,2-dicarboxylate, isodecyl n-propyl cyclohexane-1,2-dicarboxylate, n-undecyl n-propyl cyclohexane-1,2-dicarboxylate, isoundecyl n-propyl cyclohexane-1,2-dicarboxylate, n-dodecyl n-propyl cyclohexane-1,2-dicarboxylate, isododecyl n-propyl cyclohexane-1,2-dicarboxylate, n-tridecyl n-propyl cyclohexane-1,2-dicarboxylate, isotridecyl n-propyl cyclohexane-1,2-dicarboxylate, n-butyl isopropyl cyclohexane-1,2-dicarboxylate, tert-butyl isopropyl cyclohexane-1,2-dicarboxylate, isobutyl isopropyl cyclohexane-1,2-dicarboxylate, glycol isopropyl cyclohexane-1,2-dicarboxylate, n-hexyl isopropyl cyclohexane-1,2-dicarboxylate, isohexyl isopropyl cyclohexane-1,2-dicarboxylate, n-heptyl isopropyl cyclohexane-1,2-dicarboxylate, isoheptyl isopropyl cyclohexane-1,2-dicarboxylate, n-octyl isopropyl cyclohexane-1,2-dicarboxylate, isooctyl isopropyl cyclohexane-1,2-dicarboxyate, 2-ethylhexyl isopropyl cyclohexane-1,2-dicarboxylate, n-nonyl isopropyl cyclohexane-1,2-dicarboxylate, isononyl isopropyl cyclohexane-1,2-dicarboxylate, 2-propylheptyl isopropyl cyclohexane-1,2-dicarboxylate, n-decyl isopropyl cyclohexane-1,2-dicarboxylate, isodecyl isopropyl cyclohexane-1,2-dicarboxylate, n-undecyl isopropyl cyclohexane-1,2-dicarboxylate, isoundecyl isopropyl cyclohexane-1,2-dicarboxylate, n-dodecyl isopropyl cyclohexane-1,2-dicarboxylate, isododecyl isopropyl cyclohexane-1,2-dicarboxylate, n-tridecyl isopropyl cyclohexane-1,2-dicarboxylate, isotridecyl isopropyl cyclohexane-1,2-dicarboxylate, tert-butyl n-butyl cyclohexane-1,2-dicarboxyate, isobutyl n-butyl cyclohexane-1,2-dicarboxylate, glycol n-butyl cyclohexane-1,2-dicarboxylate, n-hexyl n-butyl cyclohexane-1,2-dicarboxylate, isohexyl n-butyl cyclohexane-1,2-dicarboxylate, n-heptyl n-butyl cyclohexane-1,2-dicarboxylate, isohepyl n-butyl cyclohexane-1,2-dicarboxylate, n-octyl n-butyl cyclohexane-1,2-dicarboxylate, isooctyl n-butyl cyclohexane-1,2-dicarboxylate, 2-ethylhexyl n-butyl cyclohexane-1,2-dicarboxylate, n-nonyl n-butyl cyclohexane-1,2-dicarboxylate, isononyl n-butyl cyclohexane-1,2-dicarboxylate, 2-propylheptyl n-butyl cyclohexane-1,2-dicarboxylate, n-decyl n-butyl cyclohexane-1,2-dicarboxylate, isodecyl n-butyl cyclohexane-1,2-dicarboxylate, n-undecyl n-butyl cyclohexane-1,2-dicarboxylate, isoundecyl n-butyl cyclohexane-1,2-dicarboxylate, n-dodecyl n-butyl cyclohexane-1,2-dicarboxylate, isododecyl n-butyl cyclohexane-1,2-dicarboxylate, n-tridecyl n-butyl cyclohexane-1,2-dicarboxylate, isotridecyl n-butyl cyclohexane-1,2-dicarboxylate, isobutyl tert-butyl cyclohexane-1,2-dicarboxylate, glycerol tert-butyl cyclohexane-1,2-dicarboxylate, n-hexyl tert-butyl cyclohexane-1,2-dicarboxylate, isohexyl tert-butyl cyclohexane-1,2-dicarboxylate, n-heptyl tert-butyl cyclohexane-1,2-dicarboxylate, isoheptyl tert-butyl cyclohexane-1,2-dicarboxylate, n-octyl tert-butyl cyclohexane-1,2-dicarboxylate, isooctyl tert-butyl cyclohexane-1,2-dicarboxylate, 2-ethylhexyl tert-butyl cyclohexane-1,2-dicarboxylate, n-nonyl tert-butyl cyclohexane-1,2-dicarboxylate, isononyl tert-butyl cyclohexane-1,2-dicarboxylate, 2-propylheptyl tert-butyl cyclohexane-1,2-dicarboxylate, n-decyl tert-butyl cyclohexane-1,2-dicarboxylate, isodecyl tert-butyl cyclohexane-1,2-dicarboxylate, n-undecyl tert-butyl cyclohexane-1,2-dicarboxylate, isoundecyl tert-butyl cyclohexane-1,2-dicarboxylate, n-dodecyl tert-butyl cyclohexane-1,2-dicarboxylate, isododecyl tert-butyl cyclohexane-1,2-dicarboxylate, n-tridecyl tert-butyl cyclohexane-1,2-dicarboxylate, isotridecyl tert-butyl cyclohexane-1,2-dicarboxylate, glycol isobutyl cyclohexane-1,2-dicarboxylate, n-hexyl isobutyl cyclohexane-1,2-dicarboxylate, isohexyl isobutyl cyclohexane-1,2-dicarboxylate, n-heptyl isobutyl cyclohexane-1,2-dicarboxylate, isoheptyl isobutyl cyclohexane-1,2-dicarboxylate, n-octyl isobutyl cyclohexane-1,2-dicarboxylate, isooctyl isobutyl cyclohexane-1,2-dicarboxylate, 2-ethylhexyl isobutyl cyclohexane-1,2-dicarboxylate, n-nonyl isobutyl cyclohexane-1,2- dicarboxylate, isononyl isobutyl cyclohexane-1,2-dicarboxylate, 2-propylheptyl isobutyl cyclohexane-1,2-dicarboxylate, n-decyl isobutyl cyclohexane-1,2-dicarboxylate, isodecyl isobutyl cyclohexane-1,2-dicarboxylate, n-undecyl isobutyl cyclohexane-1,2-dicarboxylate, isoundecyl isobutyl cyclohexane-1,2-dicarboxylate, n-dodecyl isobutyl cyclohexane-1,2-dicarboxylate, isododecyl isobutyl cyclohexane-1,2-dicarboxylate, n-tridecyl isobutyl cyclohexane-1,2-dicarboxylate, isotridecyl isobutyl cyclohexane-1,2-dicarboxylate, n-hexylglycol cyclohexane-1,2-dicarboxylate, isohexylglycol cyclohexane-1,2-dicarboxylate, n-heptylglycol cyclohexane-1,2-dicarboxylate, isoheptylglycol cyclohexane-1,2-dicarboxylate, n-octylglycol cyclohexane-1,2-dicarboxylate, isooctylglycol cyclohexane-1,2-dicarboxylate, 2-ethylhexylglycol cyclohexane-1,2-dicarboxylate, n-nonylglycol cyclohexane-1,2-dicarboxylate, isononylglycol cyclohexane-1,2-dicarboxylate, 2-propylheptylglycol cyclohexane-1,2-dicarboxylate, n-decylglycol cyclohexane-1,2-dicarboxylate, isodecylglycol cyclohexane-1,2-dicarboxylate, n-undecylglycol cyclohexane-1,2-dicarboxylate, isoundecylglycol cyclohexane-1,2-dicarboxylate, n-dodecylglycol cyclohexane-1,2-dicarboxylate, isododecylglycol cyclohexane-1,2-dicarboxylate, n-tridecylglycol cyclohexane-1,2-dicarboxylate, isotridecylglycol cyclohexane-1,2-dicarboxylate, isohexyl n-hexyl cyclohexane-1,2-dicarboxylate, n-heptyl n-hexyl cyclohexane-1,2-dicarboxylate, isoheptyl n-hexyl cyclohexane-1,2-dicarboxylate, n-octyl n-hexyl cyclohexane-1,2-dicarboxylate, isooctyl n-hexyl cyclohexane-1,2-dicarboxylate, 2-ethylhexyl n-hexyl cyclohexane-1,2-dicarboxylate, n-nonyl n-hexyl cyclohexane-1,2-dicarboxylate, isononyl n-hexyl cyclohexane-1,2-dicarboxylate, 2-propylheptyl n-hexyl cyclohexane-1,2-dicarboxylate, n-decyl n-hexyl cyclohexane-1,2-dicarboxylate, isodecyl n-hexyl cyclohexane-1,2-dicarboxylate, n-undecyl n-hexyl cyclohexane-1,2-dicarboxylate, isoundecyl n-hexyl cyclohexane-1,2-dicarboxylate, n-dodecyl n-hexyl cyclohexane-1,2-dicarboxylate, isododecyl n-hexyl cyclohexane-1,2-dicarboxylate, n-tridecyl n-hexyl cyclohexane-1,2-dicarboxylate, isotridecyl n-hexyl cyclohexane-1,2-dicarboxylate, n-heptyl isohexyl cyclohexane-1,2-dicarboxylate, isoheptyl isohexyl cyclohexane-1,2-dicarboxylate, n-octyl isohexyl cyclohexane-1,2-dicarboxylate, isooctyl isohexyl cyclohexane-1,2-dicarboxylate, 2-ethylhexyl isohexyl cyclohexane-1,2-dicarboxylate, n-nonyl isohexyl cyclohexane-1,2-dicarboxylate, isononyl isohexyl cyclohexane-1,2-dicarboxylate, 2-propylheptyl isohexyl cyclohexane-1,2-dicarboxylate, n-decyl isohexyl cyclohexane-1,2-dicarboxylate, isodecyl isohexyl cyclohexane-1,2-dicarboxylate, n-undecyl isohexyl cyclohexane-1,2-dicarboxylate, isoundecyl isohexyl cyclohexane-1,2-dicarboxylate, n-dodecyl isohexyl cyclohexane-1,2-dicarboxylate, isododecyl isohexyl cyclohexane-1,2-dicarboxylate, n-tridecyl isohexyl cyclohexane-1,2-dicarboxylate, isotridecyl isohexyl cyclohexane-1,2-dicarboxylate, isoheptyl n-heptyl cyclohexane-1,2-dicarboxylate, n-octyl n-heptyl cyclohexane-1,2-dicarboxylate, isooctyl n-heptyl cyclohexane-1,2-dicarboxylate, 2-ethylhexyl n-heptyl cyclohexane-1,2-dicarboxylate, n-nonyl n-heptyl cyclohexane-1,2-dicarboxylate, isononyl n-heptyl cyclohexane-1,2-dicarboxylate, 2-propylheptyl n-heptyl cyclohexane-1,2-dicarboxylate, n-decyl h-heptyl cyclohexane-1,2-dicarboxylate, isodecyl n-heptyl cyclohexane-1,2-dicarboxylate, n-unecyl n-heptyl cyclohexane-1,2-dicarboxylate, isoundecyl n-heptyl cyclohexane-1,2-dicarboxylate, n-dodecyl n-heptyl cyclohexane-1,2-dicarboxylate, isododecyl n-heptyl cyclohexane-1,2-dicarboxylate, n-tridecyl n-heptyl cyclohexane-1,2-dicarboxylate, isotridecyl n-heptyl cyclohexane-1,2-dicarboxylate, n-octyl isoheptyl cyclohexane-1,2-dicarboxylate, isooctyl isoheptyl cyclohexane-1,2-dicarboxylate, 2-ethylhexyl isoheptyl cyclohexane-1,2-dicarboxylate, n-nonyl isoheptyl cyclohexane-1,2-dicarboxylate, isononyl isoheptyl cyclohexane-1,2-dicarboxylate, 2-propylheptyl isoheptyl cyclohexane-1,2-dicarboxylate, n-decyl isoheptyl cyclohexane-1,2-dicarboxylate, isodecyl isoheptyl cyclohexane-1,2-dicarboxylate, n-undecyl isoheptyl cyclohexane-1,2-dicarboxylate, isoundecyl isoheptyl cyclohexane-1,2-dicarboxylate, n-dodecyl isoheptyl cyclohexane-1,2-dicarboxylate, isododecyl isoheptyl cyclohexane-1,2-dicarboxylate, n-tridecyl isoheptyl cyclohexane-1,2-dicarboxylate, isotridecyl isoheptyl cyclohexane-1,2-dicarboxylate, isooctyl n-octyl cyclohexane-1,2-dicarboxylate, 2-ethylhexyl n-octyl cyclohexane-1,2-dicarboxylate, n-nonyl n-octyl cyclohexane-1,2-dicarboxylate, isononyl n-octyl cyclohexane-1,2-dicarboxylate, 2-propylheptyl n-octyl cyclohexane-1,2-dicarboxylate, n-decyl n-octyl cyclohexane-1,2-dicarboxylate, isodecyl n-octyl cyclohexane-1,2-dicarboxylate, n-undecyl n-octyl cyclohexane-1,2-dicarboxylate, isoundecyl n-octyl cyclohexane-1,2-dicarboxylate, n-dodecyl n-octyl cyclohexane-1,2-dicarboxylate, isododecyl n-octyl cyclohexane-1,2-dicarboxylate, n-tridecyl n-octyl cyclohexane-1,2-dicarboxylate, isotridecyl n-octyl cyclohexane-1,2-dicarboxylate, 2-ethylhexyl isooctyl cyclohexane-1,2-dicarboxylate, n-nonyl isooctyl cyclohexane-1,2-dicarboxylate, isononyl isooctyl cyclohexane-1,2-dicarboxylate, 2-propylheptyl isooctyl cyclohexane-1,2-dicarboxylate, n-decyl isooctyl cyclohexane-1,2-dicarboxylate, isodecyl isooctyl cyclohexane-1,2-dicarboxylate, n-undecyl isooctyl cyclohexane-1,2-dicarboxylate, isoundecyl isooctyl cyclohexane-1,2-dicarboxylate, n-dodecyl isooctyl cyclohexane-1,2-dicarboxylate, isododecyl isooctyl cyclohexane-1,2-dicarboxylate, n-tridecyl isooctyl cyclohexane-1,2-dicarboxylate, isotridecyl isooctyl cyclohexane-1,2-dicarboxylate, 2-ethylhexyl n-nonyl cyclohexane-1,2-dicarboxylate, 2-ethylhexyl isononyl cyclohexane-1,2-dicarboxylate, 2-propylheptyl 2-ethylhexyl cyclohexane-1,2-dicarboxylate, n-decyl 2-ethylhexyl cyclohexane-1,2-dicarboxylate, isodecyl 2-ethylhexyl cyclohexane-1,2-dicarboxylate, n-undecyl 2-ethylhexyl cyclohexane-1,2-dicarboxylate, isoundecyl 2-ethylhexyl cyclohexane-1,2-dicarboxylate, n-dodecyl 2-ethylhexyl cyclohexane-1,2-dicarboxylate, isododecyl 2-ethylhexyl cyclohexane-1,2-dicarboxylate, n-tridecyl 2-ethylhexyl cyclohexane-1,2-dicarboxylate, isotridecyl 2-ethylhexyl cyclohexane-1,2-dicarboxylate, isononyl n-nonyl cyclohexane-1,2-dicarboxylate, 2-propylheptyl n-nonyl cyclohexane-1,2-dicarboxylate, n-decyl n-nonyl cyclohexane-1,2-dicarboxylate, isodecyl n-nonyl cyclohexane-1,2-dicarboxylate, n-undecyl n-nonyl cyclohexane-1,2-dicarboxylate, isoundecyl n-nonyl cyclohexane-1,2-dicarboxylate, n-dodecyl n-nonyl cyclohexane-1,2-dicarboxylate, isododecyl n-nonyl cyclohexane-1,2-dicarboxylate, n-tridecyl n-nonyl cyclohexane-1,2- dicarboxylate, isotridecyl n-nonyl cyclohexane-1,2-dicarboxylate, 2-propylheptyl isononyl cyclohexane-1,2-dicarboxylate, n-decyl isononyl cyclohexane-1,2-dicarboxylate, isodecyl isononyl cyclohexane-1,2-dicarboxylate, n-undecyl isononyl cyclohexane-1,2-dicarboxylate, isoundecyl isononyl cyclohexane-1,2-dicarboxylate, n-dodecyl isononyl cyclohexane-1,2-dicarboxylate, isododecyl isononyl cyclohexane-1,2-dicarboxylate, n-tridecyl isononyl cyclohexane-1,2-dicarboxylate, isotridecyl isononyl cyclohexane-1,2-dicarboxylate, n-decyl 2-propylheptyl cyclohexane-1,2-dicarboxylate, isodecyl 2-propylheptyl cyclohexane-1,2-dicarboxylate, n-undecyl 2-propylheptyl cyclohexane-1,2-dicarboxylate, isoundecyl 2-propylheptyl cyclohexane-1,2-dicarboxylate, n-dodecyl 2-propylheptyl cyclohexane-1,2-dicarboxylate, isododecyl 2-propylheptyl cyclohexane-1,2-dicarboxylate, n-tridecyl 2-propylheptyl cyclohexane-1,2-dicarboxylate, isotridecyl 2-propylheptyl cyclohexane-1,2-dicarboxylate, isodecyl n-decyl cyclohexane-1,2-dicarboxylate, n-undecyl n-decyl cyclohexane-1,2-dicarboxylate, isoundecyl n-decyl cyclohexane-1,2-dicarboxylate, n-dodecyl n-decyl cyclohexane-1,2-dicarboxylate, isododecyl n-decyl cyclohexane-1,2-dicarboxylate, n-tridecyl n-decyl cyclohexane-1,2-dicarboxylate, isotridecyl n-decyl cyclohexane-1,2-dicarboxylate, n-undecyl isodecyl cyclohexane-1,2-dicarboxylate, isoundecyl isodecyl cyclohexane-1,2-dicarboxylate, n-dodecyl isodecyl cyclohexane-1,2-dicarboxylate, isododecyl isodecyl cyclohexane-1,2-dicarboxylate, n-tridecyl isodecyl cyclohexane-1,2-dicarboxylate, isotridecyl isodecyl cyclohexane-1,2-dicarboxylate, isoundecyl n-undecyl cyclohexane-1,2-dicarboxylate, n-dodecyl n-undecyl cyclohexane-1,2-dicarboxylate, isododecyl n-undecyl cyclohexane-1,2-dicarboxylate, n-tridecyl n-undecyl cyclohexane-1,2-dicarboxylate, isotridecyl n-undecyl cyclohexane-1,2-dicarboxylate, n-dodecyl isoundecyl cyclohexane-1,2-dicarboxylate, isododecyl isoundecyl cyclohexane-1,2-dicarboxylate, n-tridecyl isoundecyl cyclohexane-1,2-dicarboxylate, isotridecyl isoundecyl cyclohexane-1,2-dicarboxylate, isododecyl n-dodecyl cyclohexane-1,2-dicarboxylate, n-tridecyl n-dodecyl cyclohexane-1,2-dicarboxylate, isotridecyl n-dodecyl cyclohexane-1,2-dicarboxylate, n-tridecyl isododecyl cyclohexane-1,2-dicarboxylate, isotridecyl isododecyl cyclohexane-1,2-dicarboxylate, isotridecyl n-tridecyl cyclohexane-1,2-dicarboxylate, methylcyclohexyl cyclohexane-1,2-dicarboxylate, ethylcyclohexyl cyclohexane-1,2-dicarboxylate, n-propylcyclohexyl cyclohexane-1,2-dicarboxylate, isopropylcyclohexyl cyclohexane-1,2-dicarboxylate, n-butylcyclohexyl cyclohexane-1,2-dicarboxylate, tert-butylcyclohexyl cyclohexane-1,2-dicarboxylate, isobutylcyclohexyl cyclohexane-1,2-dicarboxylate, glycol cyclohexyl cyclohexane-1,2-dicarboxylate, n-hexylcyclohexyl cyclohexane-1,2-dicarboxylate, isohexylcyclohexyl cyclohexane-1,2-dicarboxylate, n-heptylcyclohexyl cyclohexane-1,2-dicarboxylate, isoheptylcyclohexyl cyclohexane-1,2-dicarboxylate, n-octylcyclohexyl cyclohexane-1,2-dicarboxylate, isooctylcyclohexyl cyclohexane-1,2-dicarboxylate, 2-ethylhexyl cyclohexyl cyclohexane-1,2-dicarboxylate, n-nonylcyclohexyl cyclohexane-1,2-dicarboxylate, isononyl cyclohexyl cyclohexane-1,2-dicarboxylate, 2-propylheptyl cyclohexyl cyclohexane-1,2-dicarboxylate, n-decyl cyclohexyl cyclohexane-1,2-dicarboxylate, isodecyl cyclohexyl cyclohexane-1,2-dicarboxylate, n-undecyl cyclohexyl cyclohexane-1,2-dicarboxylate, isoundecyl cyclohexyl cyclohexane-1,2-dicarboxylate, n-dodecyl cyclohexyl cyclohexane-1,2-dicarboxylate, isododecyl cyclohexyl cyclohexane-1,2-dicarboxylate, n-tridecyl cyclohexyl cyclohexane-1,2-dicarboxylate, isotridecyl cyclohexyl cyclohexane-1,2-dicarboxylate, methyl isopentyl cyclohexane-1,2-dicarboxylate, ethyl isopentyl cyclohexane-1,2-dicarboxylate, n-propyl isopentyl cyclohexane-1,2-dicarboxylate, isopropyl isopentyl cyclohexane-1,2-dicarboxylate, n-butyl isopentyl cyclohexane-1,2-dicarboxylate, tert-butyl isopentyl cyclohexane-1,2-dicarboxylate, isobutyl isopentyl cyclohexane-1,2-dicarboxylate, glycol isopentyl cyclohexane-1,2-dicarboxylate, n-hexyl isopentyl cyclohexane-1,2-dicarboxylate, isohexyl isopentyl cyclohexane-1,2-dicarboxylate, n-heptyl isopentyl cyclohexane-1,2-dicarboxylate, isoheptyl isopentyl cyclohexane-1,2-dicarboxylate, n-octyl isopentyl cyclohexane-1,2-dicarboxylate, isooctyl isopentyl cyclohexane-1,2-dicarboxylate, 2-ethylhexyl isopentyl cyclohexane-1,2-dicarboxylate, n-nonyl isopentyl cyclohexane-1,2-dicarboxylate, isononyl isopentyl cyclohexane-1,2-dicarboxylate, 2-propylheptyl isopentyl cyclohexane-1,2-dicarboxylate, n-decyl isopentyl cyclohexane-1,2-dicarboxylate, isodecyl isopentyl cyclohexane-1,2-dicarboxylate, n-undecyl isopentyl cyclohexane-1,2-dicarboxylate, isoundecyl isopentyl cyclohexane-1,2-dicarboxylate, n-dodecyl isopentyl cyclohexane-1,2-dicarboxylate, isododecyl isopentyl cyclohexane-1,2-dicarboxylate, n-tridecyl isopentyl cyclohexane-1,2-dicarboxylate, isotridecyl isopentyl cyclohexane-1,2-dicarboxylate, methyl n-pentyl cyclohexane-1,2-dicarboxylate, ethyl n-pentyl cyclohexane-1,2-dicarboxylate, n-propyl n-pentyl cyclohexane-1,2-dicarboxylate, isopropyl n-pentyl cyclohexane-1,2-dicarboxylate, n-butyl n-pentyl cyclohexane-1,2-dicarboxylate, tert-butyl n-pentyl cyclohexane-1,2-dicarboxylate, isobutyl n-pentyl cyclohexane-1,2-dicarboxylate, glycol n-pentyl cyclohexane-1,2-dicarboxylate, n-hexyl n-pentyl cyclohexane-1,2-dicarboxylate, isohexyl n-pentyl cyclohexane-1,2-dicarboxylate, n-heptyl n-pentyl cyclohexane-1,2-dicarboxylate, isoheptyl n-pentyl cyclohexane-1,2-dicarboxylate, n-octyl n-pentyl cyclohexane-1,2-dicarboxylate, isooctyl n-pentyl cyclohexane-1,2-dicarboxylate, 2-ethylhexyl n-pentyl cyclohexane-1,2-dicarboxylate, n-nonyl n-pentyl cyclohexane-1,2-dicarboxylate, isononyl n-pentyl cyclohexane-1,2-dicarboxylate, 2-propylheptyl n-pentyl cyclohexane-1,2-dicarboxylate, n-decyl n-pentyl cyclohexane-1,2-dicarboxylate, isodecyl n-pentyl cyclohexane-1,2-dicarboxylate, n-undecyl n-pentyl cyclohexane-1,2-dicarboxylate, isoundecyl n-pentyl cyclohexane-1,2-dicarboxylate, n-dodecyl n-pentyl cyclohexane-1,2-dicarboxylate, isododecyl n-pentyl cyclohexane-1,2-dicarboxylate, n-tridecyl n-pentyl cyclohexane-1,2-dicarboxylate, isotridecyl n-pentyl cyclohexane-1,2-dicarboxylate;

mixed esters of cyclohexane-1,3-dicarboxylic acid with $C_1$- to $C_{13}$-alcohols, such as, for example, ethyl methyl cyclohexane-1,3-dicarboxylate, n-propyl methyl cyclohexane-1,3-dicarboxylate, isopropyl methyl cyclohexane-1,3-dicarboxylate, n-butyl methyl cyclohexane-1,3-dicarboxylate, tert-butyl methyl cyclohexane-1,3-dicarboxylate, isobutyl methyl cyclohexane-1,3-dicarboxylate, glycol methyl cyclohexane-1,3-dicarboxylate, n-hexyl methyl cyclohexane-1,3- dicarboxylate, isohexyl methyl cyclohexane-1,3-dicarboxylate, n-heptyl methyl cyclohexane-1,3-dicarboxylate, isoheptyl methyl cyclohexane-1,3-dicarboxylate, n-octyl methyl cyclohexane-1,3-dicarboxylate, isooctyl methyl cyclohexane-1,3-dicarboxylate, 2-ethylhexyl methyl cyclohexane-1,3-dicarboxylate, n-nonyl methyl cyclohexane-1,3-dicarboxylate, isononyl methyl cyclohexane-1,3-dicarboxylate, 2-propylheptyl methyl cyclohexane-1,3-dicarboxylate, n-decyl methyl cyclohexane-1,3-dicarboxylate, isodecyl methyl cyclohexane-1,3-dicarboxylate, n-undecyl methyl cyclohexane-1,3-dicarboxylate, isoundecyl methyl cyclohexane-1,3-dicarboxylate, n-dodecyl methyl cyclohexane-1,3-dicarboxylate, isododecyl methyl cyclohexane-1,3-dicarboxylate, n-tridecyl methyl cyclohexane-1,3-dicarboxylate, isotridecyl methyl cyclohexane-1,3-dicarboxylate, n-propyl ethyl cyclohexane-1,3-dicarboxylate, isopropyl ethyl cyclohexane-1,3-dicarboxylate, n-butyl ethyl cyclohexane-1,3-dicarboxylate, tert-butyl ethyl cyclohexane-1,3-dicarboxylate, isobutyl ethyl cyclohexane-1,3-dicarboxylate, glycol ethyl cyclohexane-1,3-dicarboxylate, n-hexyl ethyl cyclohexane-1,3-dicarboxylate, isohexyl ethyl cyclohexane-1,3-dicarboxylate, n-heptyl ethyl cyclohexane-1,3-dicarboxylate, isoheptyl ethyl cyclohexane-1,3-dicarboxylate, n-octyl ethyl cyclohexane-1,3-dicarboxylate, isooctyl ethyl cyclohexane-1,3-dicarboxylate, 2-ethylhexyl ethyl cyclohexane-1,3-dicarboxylate, n-nonyl ethyl cyclohexane-1,3-dicarboxylate, isononyl ethyl cyclohexane-1,3-dicarboxylate, 2-propylheptyl ethyl cyclohexane-1,3-dicarboxylate, n-decyl ethyl cyclohexane-1,3-dicarboxylate, isodecyl ethyl cyclohexane-1,3-dicarboxylate, n-undecyl ethyl cyclohexane-1,3-dicarboxylate, isoundecyl ethyl cyclohexane-1,3-dicarboxylate, n-dodecyl ethyl cyclohexane-1,3-dicarboxylate, isododecyl ethyl cyclohexane-1,3-dicarboxylate, n-tridecyl ethyl cyclohexane-1,3-dicarboxylate, isotridecyl ethyl cyclohexane-1,3-dicarboxylate, isopropyl n-propyl cyclohexane-1,3-dicarboxylate, n-butyl n-propyl cyclohexane-1,3-dicarboxylate, tert-butyl n-propyl cyclohexane-1,3-dicarboxylate, isobutyl n-propyl cyclohexane-1,3-dicarboxylate, glycol n-propyl cyclohexane-1,3-dicarboxylate, n-hexyl n-propyl cyclohexane-1,3-dicarboxylate, isohexyl n-propyl cyclohexane-1,3-dicarboxylate, n-heptyl n-propyl cyclohexane-1,3-dicarboxylate, isoheptyl n-propyl cyclohexane-1,3-dicarboxylate, n-octyl n-propyl cyclohexane-1,3-dicarboxylate, isooctyl n-propyl cyclohexane-1,3-dicarboxylate, 2-ethylhexyl n-propyl cyclohexane-1,3-dicarboxylate, n-nonyl n-propyl cyclohexane-1,3-dicarboxylate, isononyl n-propyl cyclohexane-1,3-dicarboxylate, 2-propylheptyl n-propyl cyclohexane-1,3-dicarboxylate, n-decyl n-propyl cyclohexane-1,3-dicarboxylate, isodecyl n-propyl cyclohexane-1,3-dicarboxylate, n-undecyl n-propyl cyclohexane-1,3-dicarboxylate, isoundecyl n-propyl cyclohexane-1,3-dicarboxylate, n-dodecyl n-propyl cyclohexane-1,3-dicarboxylate, isododecyl n-propyl cyclohexane-1,3-dicarboxylate, n-tridecyl n-propyl cyclohexane-1,3-dicarboxylate, isotridecyl n-propyl cyclohexane-1,3-dicarboxylate, n-butyl isopropyl cyclohexane-1,3-dicarboxylate, tert-butyl isopropyl cyclohexane-1,3-dicarboxylate, isobutyl isopropyl cyclohexane-1,3-dicarboxylate, glycol isopropyl cyclohexane-1,3-dicarboxylate, n-hexyl isopropyl cyclohexane-1,3-dicarboxylate, isohexyl isopropyl cyclohexane-1,3-dicarboxylate, n-heptyl isopropyl cyclohexane-1,3-dicarboxylate, isoheptyl isopropyl cyclohexane-1,3-dicarboxylate, n-octyl isopropyl cyclohexane-1,3-dicarboxylate, isooctyl isopropyl cyclohexane-1,3-dicarboxylate, 2-ethylhexyl isopropyl cyclohexane-1,3-dicarboxylate, n-nonyl isopropyl cyclohexane-1,3-dicarboxylate, isononyl isopropyl cyclohexane-1,3-dicarboxylate, 2-propylheptyl isopropyl cyclohexane-1,3-dicarboxylate, n-decyl isopropyl cyclohexane-1,3-dicarboxylate, isodecyl isopropyl cyclohexane-1,3-dicarboxylate, n-undecyl isopropyl cyclohexane-1,3-dicarboxylate, isoundecyl isopropyl cyclohexane-1,3-dicarboxylate, n-dodecyl isopropyl cyclohexane-1,3-dicarboxylate, isododecyl isopropyl cyclohexane-1,3-dicarboxylate, n-tridecyl isopropyl cyclohexane-1,3-dicarboxylate, isotridecyl isopropyl cyclohexane-1,3-dicarboxylate, tert-butyl n-butyl cyclohexane-1,3-dicarboxylate, isobutyl n-butyl cyclohexane-1,3-dicarboxylate, glycol n-butyl cyclohexane-1,3-dicarboxylate, n-hexyl n-butyl cyclohexane-1,3-dicarboxylate, isohexyl n-butyl cyclohexane-1,3-dicarboxylate, n-heptyl n-butyl cyclohexane-1,3-dicarboxylate, isoheptyl n-butyl cyclohexane-1,3-dicarboxylate, n-octyl n-butyl cyclohexane-1,3-dicarboxylate, isooctyl n-butyl cyclohexane-1,3-dicarboxylate, 2-ethylhexyl n-butyl cyclohexane-1,3-dicarboxylate, n-nonyl n-butyl cyclohexane-1,3-dicarboxylate, isononyl n-butyl cyclohexane-1,3-dicarboxylate, 2-propylheptyl n-butyl cyclohexane-1,3-dicarboxylate, n-decyl n-butyl cyclohexane-1,3-dicarboxylate, isodecyl n-butyl cyclohexane-1,3-dicarboxylate, n-undecyl n-butyl cyclohexane-1,3-dicarboxylate, isoundecyl n-butyl cyclohexane-1,3-dicarboxylate, n-dodecyl n-butyl cyclohexane-1,3-dicarboxylate, isododecyl n-butyl cyclohexane-1,3-dicarboxylate, n-tridecyl n-butyl cyclohexane-1,3-dicarboxylate, isotridecyl n-butyl cyclohexane-1,3-dicarboxylate, isobutyl tert-butyl cyclohexane-1,3-dicarboxylate, glycol tert-butyl cyclohexane-1,3-dicarboxylate, n-hexyl tert-butyl cyclohexane-1,3-dicarboxylate, isohexyl tert-butyl cyclohexane-1,3-dicarboxylate, n-heptyl tert-butyl cyclohexane-1,3-dicarboxylate, isoheptyl tert-butyl cyclohexane-1,3-dicarboxylate, n-octyl tert-butyl cyclohexane-1,3-dicarboxylate, isooctyl tert-butyl cyclohexane-1,3-dicarboxylate, 2-ethylhexyl tert-butyl cyclohexane-1,3-dicarboxylate, n-nonyl tert-butyl cyclohexane-1,3-dicarboxylate, isononyl tert-butyl cyclohexane-1,3-dicarboxylate, 2-propylheptyl tert-butyl cyclohexane-1,3-dicarboxylate, n-decyl tert-butyl cyclohexane-1,3-dicarboxylate, isodecyl tert-butyl cyclohexane-1,3-dicarboxylate, n-undecyl tert-butyl cyclohexane-1,3-dicarboxylate, isoundecyl tert-butyl cyclohexane-1,3-dicarboxylate, n-dodecyl tert-butyl cyclohexane-1,3-dicarboxylate, isododecyl tert-butyl cyclohexane-1,3-dicarboxylate, n-tridecyl tert-butyl cyclohexane-1,3-dicarboxylate, isotridecyl tert-butyl cyclohexane-1,3-dicarboxylate, glycol isobutyl cyclohexane-1,3-dicarboxylate, n-hexyl isobutyl cyclohexane-1,3-dicarboxylate, isohexyl isobutyl cyclohexane-1,3-dicarboxylate, n-heptyl isobutyl cyclohexane-1,3-dicarboxylate, isoheptyl isobutyl cyclohexane-1,3-dicarboxylate, n-octyl isobutyl cyclohexane-1,3-dicarboxylate, isooctyl isobutyl cyclohexane-1,3-dicarboxylate, 2-ethylhexyl isobutyl cyclohexane-1,3- dicarboxylate, n-nonyl isobutyl cyclohexane-1,3-dicarboxylate, isononyl isobutyl cyclohexane-1,3-dicarboxylate, 2-propylheptyl isobutyl cyclohexane-1,3-dicarboxylate, n-decyl isobutyl cyclohexane-1,3-dicarboxylate, isodecyl isobutyl cyclohexane-1,3-dicarboxylate, n-undecyl isobutyl cyclohexane-1,3-dicarboxylate, isoundecyl isobutyl cyclohexane-1,3-dicarboxylate, n-dodecyl isobutyl cyclohexane-1,3-dicarboxylate, isododecyl isobutyl cyclohexane-1,3-dicarboxylate, n-tridecyl isobutyl cyclohexane-1,3-dicarboxylate, isotridecyl isobutyl cyclohexane-1,3-dicarboxylate, n-hexylglycol cyclohexane-1,3-dicarboxylate, isohexylglycol cyclohexane-1,3-dicarboxylate, n-heptylglycol cyclohexane-1,3-dicarboxylate, isoheptylglycol cyclohexane-1,3-dicarboxylate, n-octylglycol cyclohexane-1,3-dicarboxylate isooctylglycol cyclohexane-1,3-dicarboxylate, 2-ethylhexyl glycol cyclohexane-1,3-dicarboxylate, n-nonylglycol cyclohexane-1,3-dicarboxylate, isononylglycol cyclohexane-1,3-dicarboxylate, 2-propylheptyl glycol cyclohexane-1,3-dicarboxylate, n-decylglycol cyclohexane-1,3-dicarboxylate, isodecylglycol cyclohexane-1,3-dicarboxylate, n-undecylglycol cyclohexane-1,3-dicarboxylate, isoundecylglycol cyclohexane-1,3-dicarboxylate, n-dodecylglycol cyclohexane-1,3-dicarboxylate, isododecylglycol cyclohexane-1,3-dicarboxylate, n-tridecylglycol cyclohexane-1,3-dicarboxylate, isotridecylglycol cyclohexane-1,3-dicarboxylate, isohexyl n-hexyl cyclohexane-1,3-dicarboxylate, n-heptyl n-hexyl cyclohexane-1,3-dicarboxylate, isoheptyl n-hexyl cyclohexane-1,3-dicarboxylate, n-octyl n-hexyl cyclohexane-1,3-dicarboxylate, isooctyl n-hexyl cyclohexane-1,3-dicarboxylate, 2-ethylhexyl n-hexyl cyclohexane-1,3-dicarboxylate, n-nonyl n-hexyl cyclohexane-1,3-dicarboxylate, isononyl n-hexyl cyclohexane-1,3-dicarboxylate, 2-propylheptyl n-hexyl cyclohexane-1,3-dicarboxylate, n-decyl n-hexyl cyclohexane-1,3-dicarboxylate, isodecyl n-hexyl cyclohexane-1,3-dicarboxylate, n-undecyl n-hexyl cyclohexane-1,3-dicarboxylate, isoundecyl n-hexyl cyclohexane-1,3-dicarboxylate, n-dodecyl n-hexyl cyclohexane-1,3-dicarboxylate, isododecyl n-hexyl cyclohexane-1,3-dicarboxylate, n-tridecyl n-hexyl cyclohexane-1,3-dicarboxylate, isotridecyl n-hexyl cyclohexane-1,3-dicarboxylate, n-heptyl isohexyl cyclohexane-1,3-dicarboxylate, isoheptyl isohexyl cyclohexane-1,3-dicarboxylate, n-octyl isohexyl cyclohexane-1,3-dicarboxylate, isooctyl isohexyl cyclohexane-1,3-dicarboxylate, 2-ethylhexyl isohexyl cyclohexane-1,3-dicarboxylate, n-nonyl isohexyl cyclohexane-1,3-dicarboxylate, isononyl isohexyl cyclohexane-1,3-dicarboxylate, 2-propylheptyl isohexyl cyclohexane-1,3-dicarboxylate, n-decyl isohexyl cyclohexane-1,3-dicarboxylate, isodecyl isohexyl cyclohexane-1,3-dicarboxylate, n-undecyl isohexyl cyclohexane-1,3-dicarboxylate, isoundecyl isohexyl cyclohexane-1,3-dicarboxylate, n-dodecyl isohexyl cyclohexane-1,3-dicarboxylate, isododecyl isohexyl cyclohexane-1,3-dicarboxylate, n-tridecyl isohexyl cyclohexane-1,3-dicarboxylate, isotridecyl isohexyl cyclohexane-1,3-dicarboxylate, isoheptyl n-heptyl cyclohexane-1,3-dicarboxylate, n-octyl n-heptyl cyclohexane-1,3-dicarboxylate, isooctyl n-heptyl cyclohexane-1,3-dicarboxylate, 2-ethylhexyl n-heptyl cyclohexane-1,3-dicarboxylate, n-nonyl n-heptyl cyclohexane-1,3-dicarboxylate, isononyl n-heptyl cyclohexane-1,3-dicarboxylate, 2-propylheptyl n-heptyl cyclohexane-1,3-dicarboxylate, n-decyl n-heptyl cyclohexane-1,3-dicarboxylate, isodecyl n-heptyl cyclohexane-1,3-dicarboxylate, n-undecyl n-heptyl cyclohexane-1,3-dicarboxylate, isoundecyl n-heptyl cyclohexane-1,3-dicarboxylate, n-dodecyl n-heptyl cyclohexane-1,3-dicarboxylate, isododecyl n-heptyl cyclohexane-1,3-dicarboxylate, n-tridecyl n-heptyl cyclohexane-1,3-dicarboxylate, isotridecyl n-heptyl cyclohexane-1,3-dicarboxylate, n-octyl isoheptyl cyclohexane-1,3-dicarboxylate, isooctyl isoheptyl cyclohexane-1,3-dicarboxylate, 2-ethylhexyl isoheptyl cyclohexane-1,3-dicarboxylate, n-nonyl isoheptyl cyclohexane-1,3-dicarboxylate, isononyl isoheptyl cyclohexane-1,3-dicarboxylate, 2-propylheptyl isoheptyl cyclohexane-1,3-dicarboxylate, n-decyl isoheptyl cyclohexane-1,3-dicarboxylate, isodecyl isoheptyl cyclohexane-1,3-dicarboxylate, n-undecyl isoheptyl cyclohexane-1,3-dicarboxylate, isoundecyl isoheptyl cyclohexane-1,3-dicarboxylate, n-dodecyl isoheptyl cyclohexane-1,3-dicarboxylate, isododecyl isoheptyl cyclohexane-1,3-dicarboxylate, n-tridecyl isoheptyl cyclohexane-1,3-dicarboxylate, isotridecyl isoheptyl cyclohexane-1,3-dicarboxylate, isooctyl n-octyl cyclohexane-1,3-dicarboxylate, 2-ethylhexyl n-octyl cyclohexane-1,3-dicarboxylate, n-nonyl n-octyl cyclohexane-1,3-dicarboxylate, isononyl n-octyl cyclohexane-1,3-dicarboxylate, 2-propylheptyl n-octyl cyclohexane-1,3-dicarboxylate, n-decyl n-octyl cyclohexane-1,3-dicarboxylate, isodecyl n-octyl cyclohexane-1,3-dicarboxylate, n-undecyl n-octyl cyclohexane-1,3-dicarboxylate, isoundecyl n-octyl cyclohexane-1,3-dicarboxylate, n-dodecyl n-octyl cyclohexane-1,3-dicarboxylate, isododecyl n-octyl cyclohexane-1,3-dicarboxylate, n-tridecyl n-octyl cyclohexane-1,3-dicarboxylate, isotridecyl n-octyl cyclohexane-1,3-dicarboxylate, 2-ethylhexyl isooctyl cyclohexane-1,3-dicarboxylate, n-nonyl isooctyl cyclohexane-1,3-dicarboxylate, isononyl isooctyl cyclohexane-1,3-dicarboxylate, 2-propylheptyl isooctyl cyclohexane-1,3-dicarboxylate, n-decyl isooctyl cyclohexane-1,3-dicarboxylate, isodecyl isooctyl cyclohexane-1,3-dicarboxylate, n-undecyl isooctyl cyclohexane-1,3-dicarboxylate, isoundecyl isooctyl cyclohexane-1,3-dicarboxylate, n-dodecyl isooctyl cyclohexane-1,3-dicarboxylate, isododecyl isooctyl cyclohexane-1,3-dicarboxylate, n-tridecyl isooctyl cyclohexane-1,3-dicarboxylate, isotridecyl isooctyl cyclohexane-1,3-dicarboxylate, n-nonyl 2-ethylhexyl cyclohexane-1,3-dicarboxylate, isononyl 2-ethylhexyl cyclohexane-1,3-dicarboxylate, 2-propylheptyl 2-ethylhexyl cyclohexane-1,3-dicarboxylate, n-decyl 2-ethylhexyl cyclohexane-1,3-dicarboxylate, isodecyl 2-ethylhexyl cyclohexane-1,3-dicarboxylate, n-undecyl 2-ethylhexyl cyclohexane-1,3-dicarboxylate, isoundecyl 2-ethylhexyl cyclohexane-1,3-dicarboxylate, n-dodecyl 2-ethylhexyl cyclohexane-1,3-dicarboxylate, isododecyl 2-ethylhexyl cyclohexane-1,3-dicarboxylate, n-tridecyl 2-ethylhexyl cyclohexane-1,3-dicarboxylate, isotridecyl 2-ethylhexyl cyclohexane-1,3-dicarboxylate, isononyl n-nonyl cyclohexane-1,3-dicarboxylate, 2-propylheptyl n-nonyl cyclohexane-1,3-dicarboxylate, n-decyl n-nonyl cyclohexane-1,3-dicarboxylate, isodecyl n-nonyl cyclohexane-1,3-dicarboxylate, n-undecyl n-nonyl cyclohexane-1,3-dicarboxylate, isoundecyl n-nonyl cyclohexane-1,3-dicarboxylate, n-dodecyl n-nonyl cyclohexane-1,3- dicarboxylate, isododecyl n-nonyl cyclohexane-1,3-dicarboxylate, n-tridecyl n-nonyl cyclohexane-1,3-dicarboxylate, isotridecyl n-nonyl cyclohexane-1,3-dicarboxylate, 2-propylheptyl isononyl cyclohexane-1,3-dicarboxylate, n-decyl isononyl cyclohexane-1,3-dicarboxylate, isodecyl isononyl cyclohexane-1,3-dicarboxylate, n-undecyl isononyl cyclohexane-1,3-dicarboxylate, isoundecyl isononyl cyclohexane-1,3-dicarboxylate, n-dodecyl isononyl cyclohexane-1,3-dicarboxylate, isododecyl isononyl cyclohexane-1,3-dicarboxylate, n-tridecyl isononyl cyclohexane-1,3-dicarboxylate, isotridecyl isononyl cyclohexane-1,3-dicarboxylate, n-decyl 2-propylheptyl cyclohexane-1,3-dicarboxylate, isodecyl 2-propylheptyl cyclohexane-1,3-dicarboxylate, n-undecyl 2-propylheptyl cyclohexane-1,3-dicarboxylate, isoundecyl 2-propylheptyl cyclohexane-1,3-dicarboxylate, n-dodecyl 2-propylheptyl cyclohexane-1,3-dicarboxylate, isododecyl 2-propylheptyl cyclohexane-1,3-dicarboxylate, n-tridecyl 2-propylheptyl cyclohexane-1,3-dicarboxylate, isotridecyl 2-propylheptyl cyclohexane-1,3-dicarboxylate, isodecyl n-decyl cyclohexane-1,3-dicarboxylate, n-undecyl n-decyl cyclohexane-1,3-dicarboxylate, isoundecyl n-decyl cyclohexane-1,3-dicarboxylate, n-dodecyl n-decyl cyclohexane-1,3-dicarboxylate, isododecyl n-decyl cyclohexane-1,3-dicarboxylate, n-tridecyl n-decyl cyclohexane-1,3-dicarboxylate, isotridecyl n-decyl cyclohexane-1,3-dicarboxylate, n-undecyl isodecyl cyclohexane-1,3-dicarboxylate, isoundecyl isodecyl cyclohexane-1,3-dicarboxylate, n-dodecyl isodecyl cyclohexane-1,3-dicarboxylate, isododecyl isodecyl cyclohexane-1,3-dicarboxylate, n-tridecyl isodecyl cyclohexane-1,3-dicarboxylate, isotridecyl isodecyl cyclohexane-1,3-dicarboxylate, isoundecyl n-undecyl cyclohexane-1,3-dicarboxylate, n-dodecyl n-undecyl cyclohexane-1,3-dicarboxylate, isododecyl n-undecyl cyclohexane-1,3-dicarboxylate, n-tridecyl n-undecyl cyclohexane-1,3-dicarboxylate, isotridecyl n-undecyl cyclohexane-1,3-dicarboxylate, n-dodecyl isoundecyl cyclohexane-1,3-dicarboxylate, isododecyl isoundecyl cyclohexane-1,3-dicarboxylate, n-tridecyl isoundecyl cyclohexane-1,3-dicarboxylate, isotridecyl isoundecyl cyclohexane-1,3-dicarboxylate, isododecyl n-dodecyl cyclohexane-1,3-dicarboxylate, n-tridecyl n-dodecyl cyclohexane-1,3-dicarboxylate, isotridecyl n-dodecyl cyclohexane-1,3-dicarboxylate, n-tridecyl isododecyl cyclohexane-1,3-dicarboxylate, isotridecyl isododecyl cyclohexane-1,3-dicarboxylate, isotridecyl n-tridecyl cyclohexane-1,3-dicarboxylate, methyl cyclohexyl cyclohexane-1,3-dicarboxylate, ethyl cyclohexyl cyclohexane-1,3-dicarboxylate, n-propyl cyclohexyl cyclohexane-1,3-dicarboxylate, isopropyl cyclohexyl cyclohexane-1,3-dicarboxylate, n-butyl cyclohexyl cyclohexane-1,3-dicarboxylate, tert-butyl cyclohexyl cyclohexane-1,3-dicarboxylate, isobutyl cyclohexyl cyclohexane-1,3-dicarboxylate, glycol cyclohexyl cyclohexane-1,3-dicarboxylate, n-hexyl cyclohexyl cyclohexane-1,3-dicarboxylate, isohexyl cyclohexyl cyclohexane-1,3-dicarboxylate, n-heptyl cyclohexyl cyclohexane-1,3-dicarboxylate, isoheptyl cyclohexyl cyclohexane-1,3-dicarboxylate, n-octyl cyclohexyl cyclohexane-1,3-dicarboxylate, isooctyl cyclohexyl cyclohexane-1,3-dicarboxylate, 2-ethylhexyl cyclohexyl cyclohexane-1,3-dicarboxylate, n-nonyl cyclohexyl cyclohexane-1,3-dicarboxylate, isononyl cyclohexyl cyclohexane-1,3-dicarboxylate, 2-propylheptyl cyclohexyl cyclohexane-1,3-dicarboxylate, n-decyl cyclohexyl cyclohexane-1,3-dicarboxylate, isodecyl cyclohexyl cyclohexane-1,3-dicarboxylate, n-undecyl cyclohexyl cyclohexane-1,3-dicarboxylate, isoundecyl cyclohexyl cyclohexane-1,3-dicarboxylate, n-dodecyl cyclohexyl cyclohexane-1,3-dicarboxylate, isododecyl cyclohexyl cyclohexane-1,3-dicarboxylate, n-tridecyl cyclohexyl cyclohexane-1,3-dicarboxylate, isotridecyl cyclohexyl cyclohexane-1,3-dicarboxylate, methyl isopentyl cyclohexane-1,3-dicarboxylate, ethyl isopentyl cyclohexane-1,3-dicarboxylate, n-propyl isopentyl cyclohexane-1,3-dicarboxylate, isopropyl isopentyl cyclohexane-1,3-dicarboxylate, n-butyl isopentyl cyclohexane-1,3-dicarboxylate, tert-butyl isopentyl cyclohexane-1,3-dicarboxylate, isobutyl isopentyl cyclohexane-1,3-dicarboxylate, glycol isopentyl cyclohexane-1,3-dicarboxylate, n-hexyl isopentyl cyclohexane-1,3-dicarboxylate, isohexyl isopentyl cyclohexane-1,3-dicarboxylate, n-heptyl isopentyl cyclohexane-1,3-dicarboxylate, isoheptyl isopentyl cyclohexane-1,3-dicarboxylate, n-octyl isopentyl cyclohexane-1,3-dicarboxylate, isooctyl isopentyl cyclohexane-1,3-dicarboxylate, 2-ethylhexyl isopentyl cyclohexane-1,3-dicarboxylate, n-nonyl isopentyl cyclohexane-1,3-dicarboxylate, isononyl isopentyl cyclohexane-1,3-dicarboxylate, 2-propylheptyl isopentyl cyclohexane-1,3-dicarboxylate, n-decyl isopentyl cyclohexane-1,3-dicarboxylate, isodecyl isopentyl cyclohexane-1,3-dicarboxylate, n-undecyl isopentyl cyclohexane-1,3-dicarboxylate, isoundecyl isopentyl cyclohexane-1,3-dicarboxylate, n-dodecyl isopentyl cyclohexane-1,3-dicarboxylate, isododecyl isopentyl cyclohexane-1,3-dicarboxylate, n-tridecyl isopentyl cyclohexane-1,3-dicarboxylate, isotridecyl isopentyl cyclohexane-1,3-dicarboxylate, methyl n-pentyl cyclohexane-1,3-dicarboxylate, ethyl n-pentyl cyclohexane-1,3-dicarboxylate, n-propyl n-pentyl cyclohexane-1,3-dicarboxylate, isopropyl n-pentyl cyclohexane-1,3-dicarboxylate, n-butyl n-pentyl cyclohexane-1,3-dicarboxylate, tert-butyl n-pentyl cyclohexane-1,3-dicarboxylate, isobutyl n-pentyl cyclohexane-1,3-dicarboxylate, glycol n-pentyl cyclohexane-1,3-dicarboxylate, n-hexyl n-pentyl cyclohexane-1,3-dicarboxylate, isohexyl n-pentyl cyclohexane-1,3-dicarboxylate, n-heptyl n-pentyl cyclohexane-1,3-dicarboxylate, isoheptyl n-pentyl cyclohexane-1,3-dicarboxylate, n-octyl n-pentyl cyclohexane-1,3-dicarboxylate, isooctyl n-pentyl cyclohexane-1,3-dicarboxylate, 2-ethylhexyl n-pentyl cyclohexane-1,3-dicarboxylate, n-nonyl n-pentyl cyclohexane-1,3-dicarboxylate, isononyl n-pentyl cyclohexane-1,3-dicarboxylate, 2-propylheptyl n-pentyl cyclohexane-1,3-dicarboxylate, n-decyl n-pentyl cyclohexane-1,3-dicarboxylate, isodecyl n-pentyl cyclohexane-1,3-dicarboxylate, n-undecyl n-pentyl cyclohexane-1,3-dicarboxylate, isoundecyl n-pentyl cyclohexane-1,3-dicarboxylate, n-dodecyl n-pentyl cyclohexane-1,3-dicarboxylate, isododecyl n-pentyl cyclohexane-1,3-dicarboxylate, n-tridecyl n-pentyl cyclohexane-1,3-dicarboxylate, isotridecyl n-pentyl cyclohexane-1,3-dicarboxylate;

mixed esters of cyclohexane-1,4-dicarboxylic acid with $C_1$- to $C_{13}$-alcohols, such as, for example, ethyl methyl cyclohexane-1,4-dicarboxylate, n-propyl methyl cyclohexane-1,4-dicarboxylate, isopropyl methyl cyclohexane-1,4-dicarboxylate, n-butyl methyl cyclohexane-1,4-dicarboxylate, tert-butyl methyl cyclohexane-1,4-dicarboxylate, isobutyl methyl cyclohexane-1,4- dicarboxylate, glycol methyl cyclohexane-1,4-dicarboxylate, n-hexyl methyl cyclohexane-1,4-dicarboxylate, isohexyl methyl cyclohexane-1,4-dicarboxylate, n-heptyl methyl cyclohexane-1,4-dicarboxylate, isoheptyl methyl cyclohexane-1,4-dicarboxylate, n-octyl methyl cyclohexane-1,4-dicarboxylate, isooctyl methyl cyclohexane-1,4-dicarboxylate, 2-ethylhexyl methyl cyclohexane-1,4-dicarboxylate, n-nonyl methyl cyclohexane-1,4-dicarboxylate, isononyl methyl cyclohexane-1,4-dicarboxylate, 2-propylheptyl methyl cyclohexane-1,4-dicarboxylate, n-decyl methyl cyclohexane-1,4-dicarboxylate, isodecyl methyl cyclohexane-1,4-dicarboxylate, n-undecyl methyl cyclohexane-1,4-dicarboxylate, isoundecyl methyl cyclohexane-1,4-dicarboxylate, n-dodecyl methyl cyclohexane-1,4-dicarboxylate, isododecyl methyl cyclohexane-1,4-dicarboxylate, n-tridecyl methyl cyclohexane-1,4-dicarboxylate, isotridecyl methyl cyclohexane-1,4-dicarboxylate, n-propyl ethyl cyclohexane-1,4-dicarboxylate, isopropyl ethyl cyclohexane-1,4-dicarboxylate, n-butyl ethyl cyclohexane-1,4-dicarboxylate, tert-butyl ethyl cyclohexane-1,4-dicarboxylate, isobutyl ethyl cyclohexane-1,4-dicarboxylate, glycol ethyl cyclohexane-1,4-dicarboxylate, n-hexyl ethyl cyclohexane-1,4-dicarboxylate, isohexyl ethyl cyclohexane-1,4-dicarboxylate, n-heptyl ethyl cyclohexane-1,4-dicarboxylate, isoheptyl ethyl cyclohexane-1,4-dicarboxylate, n-octyl ethyl cyclohexane-1,4-dicarboxylate, isooctyl ethyl cyclohexane-1,4-dicarboxylate, 2-ethylhexyl ethyl cyclohexane-1,4-dicarboxylate, n-nonyl ethyl cyclohexane-1,4-dicarboxylate, isononyl ethyl cyclohexane-1,4-dicarboxylate, 2-propylheptyl ethyl cyclohexane-1,4-dicarboxylate, n-decyl ethyl cyclohexane-1,4-dicarboxylate, isodecyl ethyl cyclohexane-1,4-dicarboxylate, n-undecyl ethyl cyclohexane-1,4-dicarboxylate, isoundecyl ethyl cyclohexane-1,4-dicarboxylate, n-dodecyl ethyl cyclohexane-1,4-dicarboxylate, isododecyl ethyl cyclohexane-1,4-dicarboxylate, n-tridecyl ethyl cyclohexane-1,4-dicarboxylate, isotridecyl ethyl cyclohexane-1,4-dicarboxylate, isopropyl n-propyl cyclohexane-1,4-dicarboxylate, n-butyl n-propyl cyclohexane-1,4-dicarboxylate, tert-butyl n-propyl cyclohexane-1,4-dicarboxylate, isobutyl n-propyl cyclohexane-1,4-dicarboxylate, glycol n-propyl cyclohexane-1,4-dicarboxylate, n-hexyl n-propyl cyclohexane-1,4-dicarboxylate, isohexyl n-propyl cyclohexane-1,4-dicarboxylate, n-heptyl n-propyl cyclohexane-1,4-dicarboxylate, isoheptyl n-propyl cyclohexane-1,4-dicarboxylate, n-octyl n-propyl cyclohexane-1,4-dicarboxylate, isooctyl n-propyl cyclohexane-1,4-dicarboxylate, 2-ethylhexyl n-propyl cyclohexane-1,4-dicarboxylate, n-nonyl n-propyl cyclohexane-1,4-dicarboxylate, isononyl n-propyl cyclohexane-1,4-dicarboxylate, 2-propylheptyl n-propyl cyclohexane-1,4-dicarboxylate, n-decyl n-propyl cyclohexane-1,4-dicarboxylate, isodecyl n-propyl cyclohexane-1,4-dicarboxylate, n-undecyl n-propyl cyclohexane-1,4-dicarboxylate, isoundecyl n-propyl cyclohexane-1,4-dicarboxylate, n-dodecyl n-propyl cyclohexane-1,4-dicarboxylate, isododecyl n-propyl cyclohexane-1,4-dicarboxylate, n-tridecyl n-propyl cyclohexane-1,4-dicarboxylate, isotridecyl n-propyl cyclohexane-1,4-dicarboxylate, n-butyl isopropyl cyclohexane-1,4-dicarboxylate, tert-butyl isopropyl cyclohexane-1,4-dicarboxylate, isobutyl isopropyl cyclohexane-1,4-dicarboxylate, glycol isopropyl cyclohexane-1,4-dicarboxylate, n-hexyl isopropyl cyclohexane-1,4-dicarboxylate, isohexyl isopropyl cyclohexane-1,4-dicarboxylate, n-heptyl isopropyl cyclohexane-1,4-dicarboxylate, isoheptyl isopropyl cyclohexane-1,4-dicarboxylate, n-octyl isopropyl cyclohexane-1,4-dicarboxylate, isooctyl isopropyl cyclohexane-1,4-dicarboxylate, 2-ethylhexyl isopropyl cyclohexane-1,4-dicarboxylate, n-nonyl isopropyl cyclohexane-1,4-dicarboxylate, isononyl isopropyl cyclohexane-1,4-dicarboxylate, 2-propylheptyl isopropyl cyclohexane-1,4-dicarboxylate, n-decyl isopropyl cyclohexane-1,4-dicarboxylate, isodecyl isopropyl cyclohexane-1,4-dicarboxylate, n-undecyl isopropyl cyclohexane-1,4-dicarboxylate, isoundecyl isopropyl cyclohexane-1,4-dicarboxylate, n-dodecyl isopropyl cyclohexane-1,4-dicarboxylate, isododecyl isopropyl cyclohexane-1,4-dicarboxylate, n-tridecyl isopropyl cyclohexane-1,4-dicarboxylate, isotridecyl isopropyl cyclohexane-1,4-dicarboxylate, tert-butyl n-butyl cyclohexane-1,4-dicarboxylate, isobutyl n-butyl cyclohexane-1,4-dicarboxylate, glycol n-butyl cyclohexane-1,4-dicarboxylate, n-hexyl n-butyl cyclohexane-1,4-dicarboxylate, isohexyl n-butyl cyclohexane-1,4-dicarboxylate, n-heptyl n-butyl cyclohexane-1,4-dicarboxylate, isoheptyl n-butyl cyclohexane-1,4-dicarboxylate, n-octyl n-butyl cyclohexane-1,4-dicarboxylate, isooctyl n-butyl cyclohexane-1,4-dicarboxylate, 2-ethylhexyl n-butyl cyclohexane-1,4-dicarboxylate, n-nonyl n-butyl cyclohexane-1,4-dicarboxylate, isononyl n-butyl cyclohexane-1,4-dicarboxylate, 2-propylheptyl n-butyl cyclohexane-1,4-dicarboxylate, n-decyl n-butyl cyclohexane-1,4-dicarboxylate, isodecyl n-butyl cyclohexane-1,4-dicarboxylate, n-undecyl n-butyl cyclohexane-1,4-dicarboxylate, isoundecyl n-butyl cyclohexane-1,4-dicarboxylate, n-dodecyl n-butyl cyclohexane-1,4-dicarboxylate, isododecyl n-butyl cyclohexane-1,4-dicarboxylate, n-tridecyl n-butyl cyclohexane-1,4-dicarboxylate, isotridecyl n-butyl cyclohexane-1,4-dicarboxylate, isobutyl tert-butyl cyclohexane-1,4-dicarboxylate, glycol tert-butyl cyclohexane-1,4-dicarboxylate, n-hexyl tert-butyl cyclohexane-1,4-dicarboxylate, isohexyl tert-butyl cyclohexane-1,4-dicarboxylate, n-heptyl tert-butyl cyclohexane-1,4-dicarboxylate, isoheptyl tert-butyl cyclohexane-1,4-dicarboxylate, n-octyl tert-butyl cyclohexane-1,4-dicarboxylate, isooctyl tert-butyl cyclohexane-1,4-dicarboxylate, 2-ethylhexyl tert-butyl cyclohexane-1,4-dicarboxylate, n-nonyl tert-butyl cyclohexane-1,4-dicarboxylate, isononyl tert-butyl cyclohexane-1,4-dicarboxylate, 2-propylheptyl tert-butyl cyclohexane-1,4-dicarboxylate, n-decyl tert-butyl cyclohexane-1,4-dicarboxylate, isodecyl tert-butyl cyclohexane-1,4-dicarboxylate, n-undecyl tert-butyl cyclohexane-1,4-dicarboxylate, isoundecyl tert-butyl cyclohexane-1,4-dicarboxylate, n-dodecyl tert-butyl cyclohexane-1,4-dicarboxylate, isododecyl tert-butyl cyclohexane-1,4-dicarboxylate, n-tridecyl tert-butyl cyclohexane-1,4-dicarboxylate, isotridecyl tert-butyl cyclohexane-1,4-dicarboxylate, glycol isobutyl cyclohexane-1,4-dicarboxylate, n-hexyl isobutyl cyclohexane-1,4-dicarboxylate, isohexyl isobutyl cyclohexane-1,4-dicarboxylate, n-heptyl isobutyl cyclohexane-1,4-dicarboxylate, isoheptyl isobutyl cyclohexane-1,4-dicarboxylate, n-octyl isobutyl cyclohexane-1,4- dicarboxylate, isooctyl isobutyl cyclohexane-1,4-dicarboxylate, 2-ethylhexyl isobutyl cyclohexane-1,4-dicarboxylate, n-nonyl isobutyl cyclohexane-1,4-dicarboxylate, isononyl isobutyl cyclohexane-1,4-dicarboxylate, 2-propylheptyl isobutyl cyclohexane-1,4-dicarboxylate, n-decyl isobutyl cyclohexane-1,4-dicarboxylate, isodecyl isobutyl cyclohexane-1,4-dicarboxylate, n-undecyl isobutyl cyclohexane-1,4-dicarboxylate, isoundecyl isobutyl cyclohexane-1,4-dicarboxylate, n-dodecyl isobutyl cyclohexane-1,4-dicarboxylate, isododecyl isobutyl cyclohexane-1,4-dicarboxylate, n-tridecyl isobutyl cyclohexane-1,4-dicarboxylate, isotridecyl isobutyl cyclohexane-1,4-dicarboxylate, n-hexylglycol cyclohexane-1,4-dicarboxylate, isohexylglycol cyclohexane-1,4-dicarboxylate, n-heptylglycol cyclohexane-1,4-dicarboxylate, isoheptylglycol cyclohexane-1,4-dicarboxylate, n-octylglycol cyclohexane-1,4-dicarboxylate, isooctylglycol cyclohexane-1,4-dicarboxylate, 2-ethylhexylglycol cyclohexane-1,4-dicarboxylate, n-nonylglycol cyclohexane-1,4-dicarboxylate, isononylglycol cyclohexane-1,4-dicarboxylate, 2-propylheptylglycol cyclohexane-1,4-dicarboxylate, n-decylglycol cyclohexane-1,4-dicarboxylate, isodecylglycol cyclohexane-1,4-dicarboxylate, n-undecylglycol cyclohexane-1,4-dicarboxylate, isoundecylglycol cyclohexane-1,4-dicarboxylate, n-dodecylglycol cyclohexane-1,4-dicarboxylate, isododecylglycol cyclohexane-1,4-dicarboxylate, n-tridecylglycol cyclohexane-1,4-dicarboxylate, isotridecylglycol cyclohexane-1,4-dicarboxylate, isohexyl n-hexyl cyclohexane-1,4-dicarboxylate, n-heptyl n-hexyl cyclohexane-1,4-dicarboxylate, isoheptyl n-hexyl cyclohexane-1,4-dicarboxylate, n-octyl n-hexyl cyclohexane-1,4-dicarboxylate, isooctyl n-hexyl cyclohexane-1,4-dicarboxylate, 2-ethylhexyl n-hexyl cyclohexane-1,4-dicarboxylate, n-nonyl n-hexyl cyclohexane-1,4-dicarboxylate, isononyl n-hexyl cyclohexane-1,4-dicarboxylate, 2-propylheptyl n-hexyl cyclohexane-1,4-dicarboxylate, n-decyl n-hexyl cyclohexane-1,4-dicarboxylate, isodecyl n-hexyl cyclohexane-1,4-dicarboxylate, n-undecyl n-hexyl cyclohexane-1,4-dicarboxylate, isoundecyl n-hexyl cyclohexane-1,4-dicarboxylate, n-dodecyl n-hexyl cyclohexane-1,4-dicarboxylate, isododecyl n-hexyl cyclohexane-1,4-dicarboxylate, n-tridecyl n-hexyl cyclohexane-1,4-dicarboxylate, isotridceyl n-hexyl cyclohexane-1,4-dicarboxylate, n-heptyl isohexyl cyclohexane-1,4-dicarboxylate, isoheptyl isohexyl cyclohexane-1,4-dicarboxylate, n-octyl isohexyl cyclohexane-1,4-dicarboxylate, isooctyl isohexyl cyclohexane-1,4-dicarboxylate, 2-ethylhexyl isohexyl cyclohexane-1,4-dicarboxylate, n-nonyl isohexyl cyclohexane-1,4-dicarboxylate, isononyl isohexyl cyclohexane-1,4-dicarboxylate, 2-propylheptyl isohexyl cyclohexane-1,4-dicarboxylate, n-decyl isohexyl cyclohexane-1,4-dicarboxylate, isodecyl isohexyl cyclohexane-1,4-dicarboxylate, n-undecyl isohexyl cyclohexane-1,4-dicarboxylate, isoundecyl isohexyl cyclohexane-1,4-dicarboxylate, n-dodecyl isohexyl cyclohexane-1,4-dicarboxylate, isododecyl isohexyl cyclohexane-1,4-dicarboxylate, n-tridecyl isohexyl cyclohexane-1,4-dicarboxylate, isotridecyl isohexyl cyclohexane-1,4-dicarboxylate, isoheptyl n-heptyl cyclohexane-1,4-dicarboxylate, n-octyl n-heptyl cyclohexane-1,4-dicarboxylate, isooctyl n-heptyl cyclohexane-1,4-dicarboxylate, 2-ethylhexyl n-heptyl cyclohexane-1,4-dicarboxylate, n-nonyl n-heptyl cyclohexane-1,4-dicarboxylate, isononyl n-heptyl cyclohexane-1,4-dicarboxylate, 2-propylheptyl n-heptyl cyclohexane-1,4-dicarboxylate, n-decyl n-heptyl cyclohexane-1,4-dicarboxylate, isodecyl n-heptyl cyclohexane-1,4-dicarboxylate, n-undecyl n-heptyl cyclohexane-1,4-dicarboxylate, isoundecyl n-heptyl cyclohexane-1,4-dicarboxylate, n-dodecyl n-heptyl cyclohexane-1,4-dicarboxylate, isododecyl n-heptyl cyclohexane-1,4-dicarboxylate, n-tridecyl n-heptyl cyclohexane-1,4-dicarboxylate, isotridecyl n-heptyl cyclohexane-1,4-dicarboxylate, n-octyl isoheptyl cyclohexane-1,4-dicarboxylate, isooctyl isoheptyl cyclohexane-1,4-dicarboxylate, 2-ethylhexyl isoheptyl cyclohexane-1,4-dicarboxylate, n-nonyl isoheptyl cyclohexane-1,4-dicarboxylate, isononyl isoheptyl cyclohexane-1,4-dicarboxylate, 2-propylheptyl isoheptyl cyclohexane-1,4-dicarboxylate, n-decyl isoheptyl cyclohexane-1,4-dicarboxylate, isodecyl isoheptyl cyclohexane-1,4-dicarboxylate, n-undecyl isoheptyl cyclohexane-1,4-dicarboxylate, isoundecyl isoheptyl cyclohexane-1,4-dicarboxylate, n-dodecyl isoheptyl cyclohexane-1,4-dicarboxylate, isododecyl isoheptyl cyclohexane-1,4-dicarboxylate, n-tridecyl isoheptyl cyclohexane-1,4-dicarboxylate, isotridecyl isoheptyl cyclohexane-1,4-dicarboxylate, isooctyl n-octyl cyclohexane-1,4-dicarboxylate, 2-ethylhexyl n-octyl cyclohexane-1,4-dicarboxylate, n-nonyl n-octyl cyclohexane-1,4-dicarboxylate, isononyl n-octyl cyclohexane-1,4-dicarboxylate, 2-propylheptyl n-octyl cyclohexane-1,4-dicarboxylate, n-decyl n-octyl cyclohexane-1,4-dicarboxylate, isodecyl n-octyl cyclohexane-1,4-dicarboxylate, n-undecyl n-octyl cyclohexane-1,4-dicarboxylate, isoundecyl n-octyl cyclohexane-1,4-dicarboxylate, n-dodecyl n-octyl cyclohexane-1,4-dicarboxylate, isododecyl n-octyl cyclohexane-1,4-dicarboxylate, n-tridecyl n-octyl cyclohexane-1,4-dicarboxylate, isotridecyl n-octyl cyclohexane-1,4-dicarboxylate, 2-ethylhexyl isooctyl cyclohexane-1,4-dicarboxylate, n-nonyl isooctyl cyclohexane-1,4-dicarboxylate, isononyl isooctyl cyclohexane-1,4-dicarboxylate, 2-propylheptyl isooctyl cyclohexane-1,4-dicarboxylate, n-decyl isooctyl cyclohexane-1,4-dicarboxylate, isodecyl isooctyl cyclohexane-1,4-dicarboxylate, n-undecyl isooctyl cyclohexane-1,4-dicarboxylate, isoundecyl isooctyl cyclohexane-1,4-dicarboxylate, n-decyl isooctyl cyclohexane-1,4-dicarboxylate, isododecyl isooctyl cyclohexane-1,4-dicarboxylate, n-tridecyl isooctyl cyclohexane-1,4-dicarboxylate, isotridecyl isooctyl cyclohexane-1,4-dicarboxylate, n-nonyl 2-ethylhexyl cyclohexane-1,4-dicarboxylate, isononyl 2-ethylhexyl cyclohexane-1,4-dicarboxylate, 2-propylheptyl 2-ethylhexyl cyclohexane-1,4-dicarboxylate, n-decyl 2-ethylhexyl cyclohexane-1,4-dicarboxylate, isodecyl 2-ethylhexyl cyclohexane-1,4-dicarboxylate, n-undecyl 2-ethylhexyl cyclohexane-1,4-dicarboxylate, isoundecyl 2-ethylhexyl cyclohexane-1,4-dicarboxylate, n-dodecyl 2-ethylhexyl cyclohexane-1,4-dicarboxylate, isododecyl 2-ethylhexyl cyclohexane-1,4-dicarboxylate, n-tridecyl 2-ethylhexyl cyclohexane-1,4-dicarboxylate, isotridecyl 2-ethylhexyl cyclohexane-1,4-dicarboxylate, isononyl n-nonyl cyclohexane-1,4-dicarboxylate, 2-propylheptyl n-nonyl cyclohexane-1,4-dicarboxylate, n-decyl n-nonyl cyclohexane-1,4-dicarboxylate, isodecyl n-nonyl cyclohexane-1,4-dicarboxylate, n-undecyl n-nonyl cyclohexane-1,4- dicarboxylate, isoundecyl n-nonyl cyclohexane-1,4-dicarboxylate, n-dodecyl n-nonyl cyclohexane-1,4-dicarboxylate, isododecyl n-nonyl cyclohexane-1,4-dicarboxylate, n-tridecyl n-nonyl cyclohexane-1,4-dicarboxylate, isotridecyl n-nonyl cyclohexane-1,4-dicarboxylate, 2-propylheptyl isononyl cyclohexane-1,4-dicarboxylate, n-decyl isononyl cyclohexane-1,4-dicarboxylate, isodecyl isononyl cyclohexane-1,4-dicarboxylate, n-undecyl isononyl cyclohexane-1,4-dicarboxylate, isoundecyl isononyl cyclohexane-1,4-dicarboxylate, n-dodecyl isononyl cyclohexane-1,4-dicarboxylate, isododecyl isononyl cyclohexane-1,4-dicarboxylate, n-tridecyl isononyl cyclohexane-1,4-dicarboxylate, isotridecyl isononyl cyclohexane-1,4-dicarboxylate, n-decyl 2-propylheptyl cyclohexane-1,4-dicarboxylate, isodecyl 2-propylheptyl cyclohexane-1,4-dicarboxylate, n-undecyl 2-propylheptyl cyclohexane-1,4-dicarboxylate, isoundecyl 2-propylheptyl cyclohexane-1,4-dicarboxylate, n-dodecyl 2-propylheptyl cyclohexane-1,4-dicarboxylate, isododecyl 2-propylheptyl cyclohexane-1,4-dicarboxylate, n-tridecyl 2-propylheptyl cyclohexane-1,4-dicarboxylate, isotridecyl 2-propylheptyl cyclohexane-1,4-dicarboxylate, isodecyl n-decyl cyclohexane-1,4-dicarboxylate, n-undecyl n-decyl cyclohexane-1,4-dicarboxylate, isoundecyl n-decyl cyclohexane-1,4-dicarboxylate, n-dodecyl n-decyl cyclohexane-1,4-dicarboxylate, isododecyl n-decyl cyclohexane-1,4-dicarboxylate, n-tridecyl n-decyl cyclohexane-1,4-dicarboxylate, isotridecyl n-decyl cyclohexane-1,4-dicarboxylate, n-undecyl isodecyl cyclohexane-1,4-dicarboxylate, isoundecyl isodecyl cyclohexane-1,4-dicarboxylate, n-dodecyl isodecyl cyclohexane-1,4-dicarboxylate, isododecyl isodecyl cyclohexane-1,4-dicarboxylate, n-tridecyl isodecyl cyclohexane-1,4-dicarboxylate, isotridecyl isodecyl cyclohexane-1,4-dicarboxylate, isoundecyl n-undecyl cyclohexane-1,4-dicarboxylate, n-dodecyl n-undecyl cyclohexane-1,4-dicarboxylate, isododecyl n-undecyl cyclohexane-1,4-dicarboxylate, n-tridecyl n-undecyl cyclohexane-1,4-dicarboxylate, isotridecyl n-undecyl cyclohexane-1,4-dicarboxylate, n-dodecyl isoundecyl cyclohexane-1,4-dicarboxylate, isododecyl isoundecyl cyclohexane-1,4-dicarboxylate, n-tridecyl isoundecyl cyclohexane-1,4-dicarboxylate, isotridecyl isoundecyl cyclohexane-1,4-dicarboxylate, isododecyl n-dodecyl cyclohexane-1,4-dicarboxylate, n-tridecyl n-dodecyl cyclohexane-1,4-dicarboxylate, isotridecyl n-dodecyl cyclohexane-1,4-dicarboxylate, n-tridecyl isododecyl cyclohexane-1,4-dicarboxylate, isotridecyl isododecyl cyclohexane-1,4-dicarboxylate, isotridecyl n-tridecyl cyclohexane-1,4-dicarboxylate, methyl cyclohexyl cyclohexane-1,4-dicarboxylate, ethyl cyclohexyl cyclohexane-1,4-dicarboxylate, n-propyl cyclohexyl cyclohexane-1,4-dicarboxylate, isopropyl cyclohexyl cyclohexane-1,4-dicarboxylate, n-butyl cyclohexyl cyclohexane-1,4-dicarboxylate, tert-butyl cyclohexyl cyclohexane-1,4-dicarboxylate, isobutyl cyclohexyl cyclohexane-1,4-dicarboxylate, glycol cyclohexyl cyclohexane-1,4-dicarboxylate, n-hexyl cyclohexyl cyclohexane-1,4-dicarboxylate, isohexyl cyclohexyl cyclohexane-1,4-dicarboxylate, n-heptyl cyclohexyl cyclohexane-1,4-dicarboxylate, isoheptyl cyclohexyl cyclohexane-1,4-dicarboxylate, n-octyl cyclohexyl cyclohexane-1,4-dicarboxylate, isooctyl cyclohexyl cyclohexane-1,4-dicarboxylate, 2-ethylhexyl cyclohexyl cyclohexane-1,4-dicarboxylate, n-nonyl cyclohexyl cyclohexane-1,4-dicarboxylate, isononyl cyclohexyl cyclohexane-1,4-dicarboxylate, 2-propylheptyl cyclohexyl cyclohexane-1,4-dicarboxylate, n-decyl cyclohexyl cyclohexane-1,4-dicarboxylate, isodecyl cyclohexyl cyclohexane-1,4-dicarboxylate, n-undecyl cyclohexyl cyclohexane-1,4-dicarboxylate, isoundecyl cyclohexyl cyclohexane-1,4-dicarboxylate, n-dodecyl cyclohexyl cyclohexane-1,4-dicarboxylate, isododecyl cyclohexyl cyclohexane-1,4-dicarboxylate, n-tridecyl cyclohexyl cyclohexane-1,4-dicarboxylate, isotridecyl cyclohexyl cyclohexane-1,4-dicarboxylate, methyl isopentyl cyclohexane-1,4-dicarboxylate, ethyl isopentyl cyclohexane-1,4-dicarboxylate, n-propyl isopentyl cyclohexane-1,4-dicarboxylate, isopropyl isopentyl cyclohexane-1,4-dicarboxylate, n-butyl isopentyl cyclohexane-1,4-dicarboxylate, tert-butyl isopentyl cyclohexane-1,4-dicarboxylate, isobutyl isopenyl cyclohexane-1,4-dicarboxylate, glycol isopentyl cyclohexane-1,4-dicarboxylate, n-hexyl isopenyl cyclohexane-1,4-dicarboxylate, isohexyl isopentyl cyclohexane-1,4-dicarboxylate, n-heptyl isopentyl cyclohexane-1,4-dicarboxylate, isoheptyl isopentyl cyclohexane-1,4-dicarboxylate, n-octyl isopentyl cyclohexane-1,4-dicarboxylate, isooctyl isopentyl cyclohexane-1,4-dicarboxylate, 2-ethylhexyl isopentyl cyclohexane-1,4-dicarboxylate, n-nonyl isopentyl cyclohexane-1,4-dicarboxylate, isononyl isopentyl cyclohexane-1,4-dicarboxylate, 2-propylheptyl isopentyl cyclohexane-1,4-dicarboxylate, n-decyl isopentyl cyclohexane-1,4-dicarboxylate, isodecyl isopentyl cyclohexane-1,4-dicarboxylate, n-undecyl isopentyl cyclohexane-1,4-dicarboxylate, isoundecyl isopentyl cyclohexane-1,4-dicarboxylate, n-dodecyl isopentyl cyclohexane-1,4-dicarboxylate, isododecyl isopentyl cyclohexane-1,4-dicarboxylate, n-tridecyl isopentyl cyclohexane-1,4-dicarboxylate, isotridecyl isopentyl cyclohexane-1,4-dicarboxylate, methyl n-pentyl cyclohexane-1,4-dicarboxylate, ethyl n-pentyl cyclohexane-1,4-dicarboxylate, n-propyl n-pentyl cyclohexane-1,4-dicarboxylate, isopropyl n-pentyl cyclohexane-1,4-dicarboxylate, n-butyl n-pentyl cyclohexane-1,4-dicarboxylate, tert-butyl n-pentyl cyclohexane-1,4-dicarboxylate, isobutyl n-pentyl cyclohexane-1,4-dicarboxylate, glycol n-pentyl cyclohexane-1,4-dicarboxylate, n-hexyl n-pentyl cyclohexane-1,4-dicarboxylate, isohexyl n-pentyl cyclohexane-1,4-dicarboxylate, n-heptyl n-pentyl cyclohexane-1,4-dicarboxylate, isoheptyl n-pentyl cyclohexane-1,4-dicarboxylate, n-octyl n-pentyl cyclohexane-1,4-dicarboxylate, isooctyl n-pentyl cyclohexane-1,4-dicarboxylate, 2-ethylhexyl n-pentyl cyclohexane-1,4-dicarboxylate, n-nonyl n-pentyl cyclohexane-1,4-dicarboxylate, isononyl n-pentyl cyclohexane-1,4-dicarboxylate, 2-propylheptyl n-pentyl cyclohexane-1,4-dicarboxylate, n-decyl n-pentyl cyclohexane-1,4-dicarboxylate, isodecyl n-pentyl cyclohexane-1,4-dicarboxylate, n-undecyl n-pentyl cyclohexane-1,4-dicarboxylate, isoundecyl n-pentyl cyclohexane-1,4-dicarboxylate, n-dodecyl n-pentyl cyclohexane-1,4-dicarboxylate, isododecyl n-pentyl cyclohexane-1,4-dicarboxylate, n-tridecyl n-pentyl cyclohexane-1,4-dicarboxylate, isotridecyl n-pentyl cyclohexane-1,4-dicarboxylate;

alkyl cyclohexane-1,3-dicarboxylates, such as, for example, monomethyl cyclohexane-1,3-dicarboxylate, dimethyl cyclohexane-1,3-dicarboxylate, diethyl cyclohexane-1,3-dicarboxylate, di-n-propyl cyclohexane-1,3-dicarboxylate, di-n-butyl cyclohexane-1,3-dicarboxylate, di-tert-butyl cyclohexane-1,3-dicarboxylate, diisobutyl cyclohexane-1,3-dicarboxylate, monoglycol cyclohexane-1,3-dicarboxylate, diglycol cyclohexane-1,3-dicarboxylate, di-n-octyl cyclohexane-1,3-dicarboxylate, diisooctyl cyclohexane-1,3-dicarboxylate, di-2-ethylhexyl cyclohexane-1,3-dicarboxylate, di-n-nonyl cyclohexane-1,3-dicarboxylate, diisononyl cyclohexane-1,3-dicarboxylate, di-n-decyl cyclohexane-1,3-dicarboxylate, diisodecyl cyclohexane-1,3-dicarboxylate, di-n-undecyl cyclohexane-1,3-dicarboxylate, diisododecyl cyclohexane-1,3-dicarboxylate, di-n-octadecyl cyclohexane-1,3-dicarboxylate, diisooctadecyl cyclohexane-1,3-dicarboxylate, di-n-eicosyl cyclohexane-1,3-dicarboxylate, monocyclohexyl cyclohexane-1,3-dicarboxylate, dicyclohexyl cyclohexane-1,3-dicarboxylate, diisopropyl cyclohexane-1,3-dicarboxylate, di-n-hexyl cyclohexane-1,3-dicarboxylate, diisohexyl cyclohexane-1,3-dicarboxylate, di-n-heptyl cyclohexane-1,3-dicarboxylate, diisoheptyl cyclohexane-1,3-dicarboxylate, di-2-propylheptyl cyclohexane-1,3-dicarboxylate, diisoundecyl cyclohexane-1,3-dicarboxylate, di-n-dodecyl cyclohexane-1,3-dicarboxylate, di-n-tridecyl cyclohexane-1,3-dicarboxylate, diisotridecyl cyclohexane-1,3-dicarboxylate, di-n-pentyl cyclohexane-1,3-dicarboxylate, diisopentyl cyclohexane-1,3-dicarboxylate;

alkyl cyclohexane-1,2,4-tricarboxylates, such as, for example, monomethyl cyclohexane-1,2,4-tricarboxylate, dimethyl cyclohexane-1,2,4-tricarboxylate, diethyl cyclohexane-1,2,4-tricarboxylate, di-n-propyl cyclohexane-1,2,4-tricarboxylate, diisopropyl cyclohexane-1,2,4-tricarboxylate, di-n-butyl cyclohexane-1,2,4-tricarboxylate, di-tert-butyl cyclohexane-1,2,4-tricarboxylate, diisobutyl cyclohexane-1,2,4-tricarboxylate, monoglycol cyclohexane-1,2,4-tricarboxylate, diglycol cyclohexane-1,2,4-tricarboxylate, di-n-octyl cyclohexane-1,2,4-tricarboxylate, diisooctyl cyclohexane-1,2,4-tricarboxylate, di-2-ethylhexyl cyclohexane-1,2,4-tricarboxylate, di-n-nonyl cyclohexane-1,2,4-tricarboxylate, diisononyl cyclohexane-1,2,4-tricarboxylate, di-n-decyl cyclohexane-1,2,4-tricarboxylate, diisodecyl cyclohexane-1,2,4-tricarboxylate, di-n-undecyl cyclohexane-1,2,4-tricarboxylate, diisododecyl cyclohexane-1,2,4-tricarboxylate, di-n-octadecyl cyclohexane-1,2,4-tricarboxylate, diisooctadecyl cyclohexane-1,2,4-tricarboxylate, di-n-eicosyl cyclohexane-1,2,4-tricarboxylate, monocyclohexyl cyclohexane-1,2,4-tricarboxylate, dicyclohexyl cyclohexane-1,2,4-tricarboxylate and trimethyl cyclohexane-1,2,4-tricarboxylate, triethyl cyclohexane-1,2,4-tricarboxylate, tri-n-propyl cyclohexane-1,2,4-tricarboxylate, tri-n-butyl cyclohexane-1,2,4-tricarboxylate, tri-tert-butyl cyclohexane-1,2,4-tricarboxylate, triisobutyl cyclohexane-1,2,4-tricarboxylate, triglycol cyclohexane-1,2,4-tricarboxylate, tri-n-octyl cyclohexane-1,2,4-tricarboxylate, triisooctyl cyclohexane-1,2,4-tricarboxylate, tri-2-ethylhexyl cyclohexane-1,2,4-tricarboxylate, tri-n-nonyl cyclohexane-1,2,4-tricarboxylate, triisononyl cyclohexane-1,2,4-tricarboxylate, tri-n-decyl cyclohexane-1,2,4-tricarboxylate, triisododecyl cyclohexane-1,2,4-tricarboxylate, tri-n-undecyl cyclohexane-1,2,4-tricarboxylate, triisododecyl cyclohexane-1,2,4-tricarboxylate, tri-n-octadecyl cyclohexane-1,2,4-tricarboxylate, triisooctadecyl cyclohexane-1,2,4-tricarboxylate, tri-n-eicosyl cyclohexane-1,2,4-tricarboxylate, tricyclohexyl cyclohexane-1,2,4-tricarboxylate, di-n-hexyl cyclohexane-1,2,4-tricarboxylate, diisohexyl cyclohexane-1,2,4-tricarboxylate, tri-n-hexyl cyclohexane-1,2,4-tricarboxylate, triisohexyl cyclohexane-1,2,4-tricarboxylate, di-n-heptyl cyclohexane-1,2,4-tricarboxylate, diisoheptyl cyclohexane-1,2,4-tricarboxylate, tri-n-heptyl cyclohexane-1,2,4-tricarboxylate, triisoheptyl cyclohexane-1,2,4-tricarboxylate, di-n-pentyl cyclohexane-1,2,4-tricarboxylate, diisopentyl cyclohexane-1,2,4-tricarboxylate, tri-n-pentyl cyclohexane-1,2,4-tricarboxylate, triisopentyl cyclohexane-1,2,4-tricarboxylate, di-n-tridecyl cyclohexane-1,2,4-tricarboxylate, diisotridecyl cyclohexane-1,2,4-tricarboxylate, tri-n-tridecyl cyclohexane-1,2,4-tricarboxylate, triisotridecyl cyclohexane-1,2,4-tricarboxylate, di-n-dodecyl cyclohexane-1,2,4-tricarboxylate, diisoundecyl cyclohexane-1,2,4-tricarboxylate, tri-n-dodecyl cyclohexane-1,2,4-tricarboxylate, triisoundecyl cyclohexane-1,2,4-tricarboxylate, triisopropyl cyclohexane-1,2,4-tricarboxylate;

alkyl cyclohexane-1,3,5-tricarboxylates, such as, for example, monomethyl cyclohexane-1,3,5-tricarboxylate, dimethyl cyclohexane-1,3,5-tricarboxylate, diethyl cyclohexane-1,3,5-tricarboxylate, di-n-propyl cyclohexane-1,3,5-tricarboxylate, di-n-butyl cyclohexane-1,3,5-tricarboxylate, di-tert-butyl cyclohexane-1,3,5-tricarboxylate, diisobutyl cyclohexane-1,3,5-tricarboxylate, monoglycol cyclohexane-1,3,5-tricarboxylate, diglycol cyclohexane-1,3,5-tricarboxylate, di-n-octyl cyclohexane-1,3,5-tricarboxylate, diisooctyl cyclohexane-1,3,5-tricarboxylate, di-2-ethylhexyl cyclohexane-1,3,5-tricarboxylate, di-n-nonyl cyclohexane-1,3,5-tricarboxylate, diisononyl cyclohexane-1,3,5-tricarboxylate, di-n-decyl cyclohexane-1,3,5-tricarboxylate, diisodecyl cyclohexane-1,3,5-tricarboxylate, di-n-undecyl cyclohexane-1,3,5-tricarboxylate, diisododecyl cyclohexane-1,3,5-tricarboxylate, di-n-octadecyl cyclohexane-1,3,5-tricarboxylate, diisooctadecyl cyclohexane-1,3,5-tricarboxylate, di-n-eicosyl cyclohexane-1,3,5-tricarboxylate, monocyclohexyl cyclohexane-1,3,5-tricarboxylate, dicyclohexyl cyclohexane-1,3,5-tricarboxylate, and trimethyl cyclohexane-1,3,5-tricarboxylate, triethyl cyclohexane-1,3,5-tricarboxylate, tri-n-propyl cyclohexane-1,3,5-tricarboxylate, tri-n-butyl cyclohexane-1,3,5-tricarboxylate, tri-tert-butyl cyclohexane-1,3,5-tricarboxylate, triisobutyl cyclohexane-1,3,5-tricarboxylate, triglycol cyclohexane-1,3,5-tricarboxylate, tri-n-octyl cyclohexane-1,3,5-tricarboxylate, triisooctyl cyclohexane-1,3,5-tricarboxylate, tri-2-ethylhexyl cyclohexane-1,3,5-tricarboxylate, tri-n-nonyl cyclohexane-1,3,5-tricarboxylate, triisononyl cyclohexane-1,3,5-tricarboxylate, tri-n-decyl cyclohexane-1,3,5-tricarboxylate, triisododecyl cyclohexane-1,3,5-tricarboxylate, tri-n-undecyl cyclohexane-1,3,5-tricarboxylate, triisododecyl cyclohexane-1,3,5-tricarboxylate, tri-n-octadecyl cyclohexane-1,3,5-tricarboxylate, triisooctadecyl cyclohexane-1,3,5-tricarboxylate, tri-n-eicosyl cyclohexane-1,3,5-tricarboxylate, tricyclohexyl cyclohexane-1,3,5-tricarboxylate, di-n-hexyl cyclohexane-1,3,5-tricarboxylate, diisohexyl cyclohexane-1,3,5-tricarboxylate, tri-n-hexyl cyclohexane-1,3,5-tricarboxylate, triisohexyl cyclohexane-1,3,5-tricarboxylate, di-n-heptyl cyclohexane-1,3,5-tricarboxylate, diisoheptyl cyclohexane-1,3,5-tricarboxylate, tri-n-heptyl cyclohexane-1,3,5-tricarboxylate, triisoheptyl cyclohexane-1,3,5-tricarboxylate, di-n-pentyl cyclohexane-1,3,5-tricarboxylate, diisopentyl cyclohexane-1,3,5-tricarboxylate, tri-n-pentyl cyclohexane-1,3,5-tricarboxylate, triisopentyl cyclohexane-1,3,5-tricarboxylate, di-n-tridecyl cyclohexane-1,3,5-tricarboxylate, diisotridecyl cyclohexane-1,3,5- tricarboxylate, tri-n-tridecyl cyclohexane-1,3,5-tricarboxylate, triisotridecyl cyclohexane-1,3,5-tricarboxylate, di-n-dodecyl cyclohexane-1,3,5-tricarboxylate, diisoundecyl cyclohexane-1,3,5-tricarboxylate, tri-n-dodecyl cyclohexane-1,3,5-tricarboxylate, triisoundecyl cyclohexane-1,3,5-tricarboxylate, triisopropyl cyclohexane-1,3,5-tricarboxylate;

alkyl cyclohexane-1,2,3-tricarboxylates, such as, for example, monomethyl cyclohexane-1,2,3-tricarboxylate, dimethyl cyclohexane-1,2,3-tricarboxylate, diethyl cyclohexane-1,2,3-tricarboxylate, di-n-propyl cyclohexane-1,2,3-tricarboxylate, di-n-butyl cyclohexane-1,2,3-tricarboxylate, di-tert-butyl cyclohexane-1,2,3-tricarboxylate, diisobutyl cyclohexane-1,2,3-tricarboxylate, monoglycol cyclohexane-1,2,3-tricarboxylate, diglycol cyclohexane-1,2,3-tricarboxylate, di-n-octyl cyclohexane-1,2,3-tricarboxylate, diisooctyl cyclohexane-1,2,3-tricarboxylate, di-2-ethylhexyl cyclohexane-1,2,3-tricarboxylate, di-n-nonyl cyclohexane-1,2,3-tricarboxylate, diisononyl cyclohexane-1,2,3-tricarboxylate, di-n-decyl cyclohexane-1,2,3-tricarboxylate, diisodecyl cyclohexane-1,2,3-tricarboxylate, di-n-undecyl cyclohexane-1,2,3-tricarboxylate, diisododecyl cyclohexane-1,2,3-tricarboxylate, di-n-octadecyl cyclohexane-1,2,3-tricarboxylate, diisooctadecyl cyclohexane-1,2,3-tricarboxylate, di-n-eicosyl cyclohexane-1,2,3-tricarboxylate, monocyclohexyl cyclohexane-1,2,3-tricarboxylate, dicyclohexyl cyclohexane-1,2,3-tricarboxylate, and trimethyl cyclohexane-1,2,3-tricarboxylate, triethyl cyclohexane-1,2,3-tricarboxylate, tri-n-propyl cyclohexane-1,2,3-tricarboxylate, tri-n-butyl cyclohexane-1,2,3-tricarboxylate, tri-tert-butyl cyclohexane-1,2,3-tricarboxylate, triisobutyl cyclohexane-1,2,3-tricarboxylate, triglycol cyclohexane-1,2,3-tricarboxylate, tri-n-octyl cyclohexane-1,2,3-tricarboxylate, triisooctyl cyclohexane-1,2,3-tricarboxylate, tri-2-ethyl cyclohexane-1,2,3-tricarboxylate, tri-n-nonyl cyclohexane-1,2,3-tricarboxylate, triisononyl cyclohexane-1,2,3-tricarboxylate, tri-n-decyl cyclohexane-1,2,3-tricarboxylate, triisododecyl cyclohexane-1,2,3-tricarboxylate, tri-n-undecyl cyclohexane-1,2,3-tricarboxylate, triisododecyl cyclohexane-1,2,3-tricarboxylate, tri-n-octadecyl cyclohexane-1,2,3-tricarboxylate, triisooctadecyl cyclohexane-1,2,3-tricarboxylate, tri-n-eicosyl cyclohexane-1,2,3-tricarboxylate, tricyclohexyl cyclohexane-1,2,3-tricarboxylate, di-n-hexyl cyclohexane-1,2,3-tricarboxylate, diisohexyl cyclohexane-1,2,3-tricarboxylate, tri-n-hexyl cyclohexane-1,2,3-tricarboxylate, triisohexyl cyclohexane-1,2,3-tricarboxylate, di-n-heptyl cyclohexane-1,2,3-tricarboxylate, diisoheptyl cyclohexane-1,2,3-tricarboxylate, tri-n-heptyl cyclohexane-1,2,3-tricarboxylate, triisoheptyl cyclohexane-1,2,3-tricarboxylate, di-n-pentyl cyclohexane-1,2,3-tricarboxylate, diisopentyl cyclohexane-1,2,3-tricarboxylate, tri-n-pentyl cyclohexane-1,2,3-tricarboxylate, triisopentyl cyclohexane-1,2,3-tricarboxylate, di-n-tridecyl cyclohexane-1,2,3-tricarboxylate, diisotridecyl cyclohexane-1,2,3-tricarboxylate, tri-n-tridecyl cyclohexane-1,2,3-tricarboxylate, triisotridecyl cyclohexane-1,2,3-tricarboxylate, di-n-dodecyl cyclohexane-1,2,3-tricarboxylate, diisoundecyl cyclohexane-1,2,3-tricarboxylate, tri-n-dodecyl cyclohexane-1,2,3-tricarboxylate, triisoundecyl cyclohexane-1,2,3-tricarboxylate, triisopropyl cyclohexane-1,2,3-tricarboxylate;

alkyl cyclohexane-1,2,4,5-tetracarboxylates, such as, for example, monomethyl cyclohexane-1,2,4,5-tetracarboxylate, dimethyl cyclohexane-1,2,4,5-tetracarboxylate, diethyl cyclohexane-1,2,4,5-tetracarboxylate, di-n-propyl cyclohexane-1,2,4,5-tetracarboxylate, di-n-butyl cyclohexane-1,2,4,5-tetracarboxylate, di-tert-butyl cyclohexane-1,2,4,5-tetracarboxylate, diisobutyl cyclohexane-1,2,4,5-tetracarboxylate, monoglycol cyclohexane-1,2,4,5-tetracarboxylate, diglycol cyclohexane-1,2,4,5-tetracarboxylate, di-n-octyl cyclohexane-1,2,4,5-tetracarboxylate, diisooctyl cyclohexane-1,2,4,5-tetracarboxylate, di-2-ethylhexyl cyclohexane-1,2,4,5-tetracarboxylate, di-n-nonyl cyclohexane-1,2,4,5-tetracarboxylate, diisononyl cyclohexane-1,2,4,5-tetracarboxylate, di-n-decyl cyclohexane-1,2,4,5-tetracarboxylate, diisodecyl cyclohexane-1,2,4,5-tetracarboxylate, di-n-undecyl cyclohexane-1,2,4,5-tetracarboxylate, diisododecyl cyclohexane-1,2,4,5-tetracarboxylate, di-n-octadecyl cyclohexane-1,2,4,5-tetracarboxylate, diisooctadecyl cyclohexane-1,2,4,5-tetracarboxylate, di-n-eicosyl cyclohexane-1,2,4,5-tetracarboxylate, monocyclohexyl cyclohexane-1,2,4,5-tetracarboxylate, trimethyl cyclohexane-1,2,4,5-tetracarboxylate, triethyl cyclohexane-1,2,4,5-tetracarboxylate, tri-n-propyl cyclohexane-1,2,4,5-tetracarboxylate, tri-n-butyl cyclohexane-1,2,4,5-tetracarboxylate, tri-tert-butyl cyclohexane-1,2,4,5-tetracarboxylate, triisobutyl cyclohexane-1,2,4,5-tetracarboxylate, triglycol cyclohexane-1,2,4,5-tetracarboxylate, tri-n-octyl cyclohexane-1,2,4,5-tetracarboxylate, triisooctyl cyclohexane-1,2,4,5-tetracarboxylate, tri-2-ethylhexyl cyclohexane-1,2,4,5-tetracarboxylate, tri-n-nonyl cyclohexane-1,2,4,5-tetracarboxylate, triisononyl cyclohexane-1,2,4,5-tetracarboxylate, tri-n-decyl cyclohexane-1,2,4,5-tetracarboxylate, triisododecyl cyclohexane-1,2,4,5-tetracarboxylate, tri-n-undecyl cyclohexane-1,2,4,5-tetracarboxylate, triisododecyl cyclohexane-1,2,4,5-tetracarboxylate, tri-n-octadecyl cyclohexane-1,2,4,5-tetracarboxylate, triisooctadecyl cyclohexane-1,2,4,5-tetracarboxylate, tri-n-eicosyl cyclohexane-1,2,4,5-tetracarboxylate, tricyclohexyl cyclohexane-1,2,4,5-tetracarboxylate, and tetramethyl cyclohexane-1,2,4,5-tetracarboxylate, tetraethyl cyclohexane-1,2,4,5-tetracarboxylate, tetra-n-propyl cyclohexane-1,2,4,5-tetracarboxylate, tetra-n-butyl cyclohexane-1,2,4,5-tetracarboxylate, tetra-tert-butyl cyclohexane-1,2,4,5-tetracarboxylate, tetraisobutyl cyclohexane-1,2,4,5-tetracarboxylate, tetraglycol cyclohexane-1,2,4,5-tetracarboxylate, tetra-n-octyl cyclohexane-1,2,4,5-tetracarboxylate, tetraisooctyl cyclohexane-1,2,4,5-tetracarboxylate, tetra-2-ethylhexyl cyclohexane-1,2,4,5-tetracarboxylate, tetra-n-nonyl cyclohexane-1,2,4,5-tetracarboxylate, tetraisononyl cyclohexane-1,2,4,5-tetracarboxylate, tetra-n-decyl cyclohexane-1,2,4,5-tetracarboxylate, tetraisodecyl cyclohexane-1,2,4,5-tetracarboxylate, tetraisododecyl cyclohexane-1,2,4,5-tetracarboxylate, tetra-n-undecyl cyclohexane-1,2,4,5-tetracarboxylate, tetra-n-octadecyl cyclohexane-1,2,4,5-tetracarboxylate, tetraisooctadecyl cyclohexane-1,2,4,5-tetracarboxylate, tetra-n-eicosyl cyclohexane-1,2,4,5-tetracarboxylate, tetracyclohexyl cyclohexane-1,2,4,5-tetracarboxylate, di-n-hexyl cyclohexane-1,2,4,5-tetracarboxylate, diisohexyl cyclohexane-1,2,4,5-tetracarboxylate, tri-n-hexyl cyclohexane-1,2,4,5-tetracarboxylate, triisohexyl cyclohexane-1,2,4,5-tetracarboxylate, di-n-heptyl cyclohexane-1,2,4,5- tetracarboxylate, diisoheptyl cyclohexane-1,2,4,5-tetracarboxylate, tri-n-heptyl cyclohexane-1,2,4,5-tetracarboxylate, triisoheptyl cyclohexane-1,2,4,5-tetracarboxylate, di-n-pentyl cyclohexane-1,2,4,5-tetracarboxylate, diisopentyl cyclohexane-1,2,4,5-tetracarboxylate, tri-n-pentyl cyclohexane-1,2,4,5-tetracarboxylate, triisopentyl cyclohexane-1,2,4,5-tetracarboxylate, di-n-tridecyl cyclohexane-1,2,4,5-tetracarboxylate, diisotridecyl cyclohexane-1,2,4,5-tetracarboxylate, tri-n-tridecyl cyclohexane-1,2,4,5-tetracarboxylate, triisotridecyl cyclohexane-1,2,4,5-tetracarboxylate, di-n-dodecyl cyclohexane-1,2,4,5-tetracarboxylate, diisoundecyl cyclohexane-1,2,4,5-tetracarboxylate, tri-n-dodecyl cyclohexane-1,2,4,5-tetracarboxylate, triisoundecyl cyclohexane-1,2,4,5-tetracarboxylate, triisopropyl cyclohexane-1,2,4,5-tetracarboxylate, tetra-n-hexyl cyclohexane-1,2,4,5-tetracarboxylate, tetraisohexyl cyclohexane-1,2,4,5-tetracarboxylate, tetra-n-heptyl cyclohexane-1,2,4,5-tetracarboxylate, tetraisoheptyl cyclohexane-1,2,4,5-tetracarboxylate, tetra-n-pentyl cyclohexane-1,2,4,5-tetracarboxylate, tetraisopentyl cyclohexane-1,2,4,5-tetracarboxylate, tetra-n-tridecyl cyclohexane-1,2,4,5-tetracarboxylate, tetraisotridecyl cyclohexane-1,2,4,5-tetracarboxylate, tetra-n-dodecyl cyclohexane-1,2,4,5-tetracarboxylate, tetraisoundecyl cyclohexane-1,2,4,5-tetracarboxylate, tetraisopropyl cyclohexane-1,2,4,5-tetracarboxylate.

Anhydrides of cyclohexane-1,2-dicarboxylic acid, cyclohexane-1,2,4-tricarboxylic acid, cyclohexane-1,2,3-tricarboxylic acid and cyclohexane-1,2,4,5-tetracarboxylic acid.

In addition, the cyclohexane-1,2-dicarboxylic esters disclosed in WO 99/32427 and listed again below are also suitable in the context of the present invention:

mixed esters of cyclohexane-1,2-dicarboxylic acid with $C_1$- to $C_{13}$-alcohols; diisopentyl cyclohexane-1,2-dicarboxylate, obtainable by hydrogenation of diisopentyl phthalate having the Chemical Abstracts Registry Number (below: CAS No.) 84777-06-0;

diisoheptyl cyclohexane-1,2-dicarboxylate, obtainable by hydrogenation of diisoheptyl phthalate having the CAS No. 71888-89-6;

diisononyl cyclohexane-1,2-dicarboxylate, obtainable by hydrogenation of a diisononyl phthalate having the CAS No. 68515-48-0;

diisononyl cyclohexane-1,2-dicarboxylate, obtainable by hydrogenation of a diisononyl phthalate having the CAS No. 28553-12-0, based n-butene;

diisononyl cyclohexane-1,2-dicarboxylate, obtainable by hydrogenation of a diisononyl phthalate having the CAS No. 28553-12-0, based on isobutene;

a 1,2-di-$C_9$-ester of cyclohexanedicarboxylic acid, obtainable by hydrogenation of a dinonyl phthalate having the CAS No. 68515-46-8;

a diisocecyl cyclohexane-1,2-dicarboxylate, obtainable by hydrogenation of a diisodecyl phthalate having the CAS No. 68515-49-1;

a 1,2-di-$C_{7-11}$-ester of cyclohexanedicarboxylic acid, obtainable by hydrogenation of the corresponding phthalic ester having the CAS No. 68515-42-4;

a 1,2-di-$C_{7-11}$-ester of cyclohexanedicarboxylic acid, obtainable by hydrogenation of the di-$C_{7-11}$-phthalates having the following CAS No.
111 381-89-6,
111 381 90-9,
111 381 91-0,
68515-44-6,
68515-45-7 and
3648-20-2;

a 1,2-di-$C_{9-11}$-ester of cyclohexanedicarboxylic acid, obtainable by hydrogenation of a di-$C_{9-11}$-phthalate having the CAS No. 98515-43-6;

a diisodecyl cyclohexane-1,2-dicarboxylate, obtainable by hydrogenation of a diisodecyl phthalate which mainly comprises di(2-propylheptyl) phthalte;

a 1,2-di-$C_{7-9}$-cyclohexanedicarboxylic ester, obtainable by hydrogenation of the corresponding phthalic ester which has branched or linear $C_{7-9}$-alkyl ester groups;

corresponding phthalates which can be used as starting materials have the following CAS No.:

di-$C_{7-9}$-alkyl phthalate having the CAS No. 111 381-89-6;
di-$C_7$-alkyl phthalate having the CAS No. 68515-44-6; and
di-$C_9$-alkyl phthalate having the CAS No. 68515-45-7.

The content of WO 99/32427, which relates, inter alia, to these compounds listed above and the preparation of cyclohexanedicarboxylic acids using specific catalysts having macropores, is completely incorporated into the present application by reference.

According to the invention, hydrogenation products of phthalic acid mixed esters with $C_{10}$- and $C_{13}$-alcohols can also be used, as described in DE-A 100 32 580.7.

Furthermore, the hydrogenation products of the commercially available benzenecarboxylic esters having the trade names Jayflex DINP (CAS No. 68515-48-0), Jayflex DIDP (CAS No. 68515-49-1), Palatinol 9-P, Vestinol 9 (CAS No. 28553-12-0), TOTM-I (CAS No. 3319-31-1), Linplast 68-TM, Palatinol N (CAS No. 28553-12-0), Jayflex DHP (CAS No. 68515-50-4), Jayflex DIOP (CAS No. 27554-26-3), Jayflex UDP (CAS No. 68515-47-9), Jayflex DIUP (CAS No. 85507-79-5), Jayflex DTDP (CAS No. 68515-47-9), Jayflex L9P (CAS No. 68515-45-7), Jayflex L911P (CAS No. 68515-43-5), Jayflex L11P (CAS No. 3648-20-2), Witamol 110 (CAS No. 90193-91-2), Witamol 118 (di-n-$C_8$-$C_{10}$-alkylphthalate), Unimoll BB (CAS No. 85-68-7), Linplast 1012 BP (CAS No. 90193-92-3), Linplast 13 XP (CAS No. 27253-26-5), Linplast 610 P (CAS No. 68515-51-5), Linplast 68 FP (CAS No. 68648-93-1) and Linplast 812 HP (CAS No. 70693-30-0), Palatinol AH (CAS No. 117-81-7), Palatinol 711 (CAS No. 68515-42-4), Palatinol 911 (CAS No. 68515-43-5), Palatinol 11 (CAS No. 3648-20-2), Palatinol Z (CAS No. 26761-40-0) and Palatinol DIPP (CAS No. 84777-06-0) are also to be considered as being suitable in the context of the present invention.

Particularly preferred low-dust construction chemistry products comprise dialkyl esters of 1,2-cyclohexanedicarboxylic acid. Straight-chain or branched alkyl groups having 1 to 13 C atoms or mixtures of said alkyl groups are preferred as ester group R. Straight-chain or branched alkyl groups having 8 to 10 C atoms or mixtures of said alkyl groups are preferred as ester group R. Alkyl groups having 9 C atoms are very particularly preferred as ester group R.

The cyclohexanepolycarboxylic acid derivatives according to the invention are distinguished from the compounds known from the prior art and intended for the dedusting of pulverulent construction chemistry products by comparable or better performance characteristics. Thus, on mixing in, they form no lumps and are rapidly distributed over the surface of the ingredients of pulverulent construction chemistry products. Their flashpoints are sufficiently high to satisfy stringent safety standards in preparation and use.

Furthermore, the additives according to the invention are distinguished by a low viscosity and high effectiveness (spreading effect) which permits the user to achieve good dedusting effects even with the use of small amounts (0.5 to 2.0% by weight).

As a result of the spreading effect present and the low viscosity, no lump formation takes place in the product to be dedusted on metering in the dedusting agent. It is therefore possible for the formulator of the above products to meter the dedusting agent directly into his existing mixing process without a particular spray device.

The preparation of the cyclohexanepolycarboxylic acid derivatives is preferably effected according to the process disclosed in WO 99/32427. This process comprises the hydrogenation of a benzenepolycarboxylic acid or of a derivative thereof or of a mixture of two or more thereof by bringing the benzenepolycarboxylic acid or the derivative thereof or the mixture of two or more thereof into contact with a gas comprising hydrogen in the presence of a catalyst which comprises, as active metal, at least one metal of subgroup VIII of the Periodic Table of the Elements, alone or together with at least one metal of subgroup I or VII of the Periodic Table of the Elements, applied to a support, the support having macropores.

In a preferred embodiment, the support has a mean pore diameter of at least 50 nm and a BET surface area of not more than 30 m$^2$/g and the amount of the active metal is 0.01 to 30% by weight, based on the total weight of the catalyst.

In a further embodiment, a catalyst is used in which the amount of the active metal is 0.01 to 30% by weight, based on the total weight of the catalyst, and 10 to 50% of the pore volume of the support are formed by macropores having a pore diameter in the range of 50 nm to 10 000 nm and 50 to 90% of the pore volume of the support are formed by mesopores having a pore diameter in the range of 2 to 50 nm, the sum of the proportions of pore volumes being 100%.

In a further embodiment, the catalyst has 0.01 to 30% by weight, based on the total weight of the catalyst, of an active metal, applied to a support, the support having a mean pore diameter of at least 0.1 μm and a BET surface area of not more than 15 m$^2$/g. Supports which may be used are in principle all supports which have macropores, i.e. supports which have exclusively macropores and those which also comprise mesopores and/or micropores in addition to macropores.

In principle, all metals of subgroup VIII of the Periodic Table of the Elements can be used as active metal. Platinum, rhodium, palladium, cobalt, nickel or ruthenium or a mixture of two or more thereof is preferably used as active metals, in particular ruthenium being used as active metal. Among the metals of subgroup I or VII or of subgroup I and VII of the Periodic Table of the Elements, all of which can in principle likewise be used, copper and/or rhenium are preferably employed.

In the context of the present application, the terms "macropores" and "mesopores" are used in the manner defined in Pure Appl. Chem., 45, page 79 (1976), namely as pores whose diameter is above 50 nm (macropores) or whose diameter is between 2 nm and 50 nm (mesopores).

The content of the active metal is in general 0.01 to 30% by weight, preferably 0.01 to 5% by weight, particularly preferably 0.1 to 5% by weight, based in each case on the total weight of the catalyst used.

The term "benzenepolycarboxylic acid or a derivative thereof" which is used comprises all benzenepolycarboxylic acids per se, for example, phthalic acid, isophthalic acid, terephthalic acid, trimellitic acid, trimesic acid, hemimellitic acid and pyromellitic acid and derivatives thereof, mono-, di-, tri- and tetraesters, in particular alkyl esters, and anhydrides being mentioned in particular. The alkyl esters of said acids are preferred, the alkyl group preferably being a radical R which was defined above.

The preferably used alkyl benzenepolycarboxylates are generally prepared by reacting benzenepolycarboxylic acids with the alcohols corresponding to the alkyl groups of the esters. Suitable reaction conditions for the reaction of the benzenepolycarboxylic acids with the corresponding alcohols are known to the person skilled in the art.

In addition to the cyclohexanepolycarboxylic acid derivatives described and cyclohexanepolycarboxylic acid derivative mixtures obtainable by the process according to the invention, isoalkane mixtures which have a very high proportion of alkanes of the same molecular weight are also suitable for the dedusting of pulverulent construction chemistry products. These include cyclohexanepolycarboxylic acid derivative mixtures which have greater than or equal to 95% by weight, preferably at least 96% by weight, in particular at least 97% by weight, of cyclohexanepolycarboxylic acid derivatives of the same molecular weight.

The present invention furthermore relates to the use of cyclohexanepolycarboxylic acid derivatives as a dust-reducing component in construction chemistry products, the cyclohexanepolycarboxylic acid derivatives being preparable according to the following process a) esterification of a benzenepolycarboxylic acid of the formula II

(II)

in which
R$^1$ denotes C$_1$-C$_{10}$-alkyl or C$_3$-C$_8$-cycloalkyl,
m denotes 0, 1, 2 or 3, and
n denotes 2, 3 or 4,
with one or more alcohols of the formulae

R—OH in which
R denotes C$_1$-C$_{30}$-alkyl, preferably C$_1$-C$_{20}$-alkyl, particularly preferably C$_1$-C$_{18}$-alkyl, very particularly preferably C$_1$-C$_{13}$-alkyl,
a benzenepolycarboxylic ester of the formula III

(III)

being obtained, b) hydrogenation of the benzenepolycarboxylic ester of the formula III to give a corresponding cyclohexanepolycarboxylic ester.

Preferred embodiments of R$^1$, m, n and R are mentioned above with regard to the cyclohexanepolycarboxylic esters according to formula I.

A preferred embodiment of the hydrogenation of the benzenepolycarboxylic ester of the formula III (step b)) is mentioned above.

Preferably used benzenepolycarboxylic acids are phthalic acid, isophthalic acid, terephthalic acid, trimellitic acid, trimesic acid, hemimellitic acid and pyromellitic acid. Phthalic acid is very particularly preferably used. The abovementioned acids are commercially available.

Preferably used alcohols are the alcohols corresponding to the radicals R of the cyclohexanepolycarboxylic acid derivatives of the formula I. Linear or branched alcohols having $C_1$-$C_{13}$-alkyl radicals are therefore preferably used. The alcohols used for the esterification with the benzenepolycarboxylic acids may be in each case the individual isomers of the alcohols, which isomers correspond to the above-mentioned radicals R, or may be mixtures of different alcohols having isomeric alkyl radicals with the same number of carbon atoms and/or may be mixtures of different alcohols having different numbers of carbon atoms.

The alcohols or alcohol mixtures suitable for the reaction with the benzenepolycarboxylic acids can be prepared by all processes known to the person skilled in the art. Suitable processes for the preparation of alcohols or process steps which are used in the preparation of alcohols are, for example:

hydroformylation with subsequent hydrogenation of the resulting aldehydes, for example as disclosed in WO 92/13818, DE-A 2 009 505, DE-A 199 24 339, EP-A 1 113 034, WO 00/63151, WO 99/25668, JP-A 1 160 928, JP-A 03 083 935, JP-A 2000/053803, EP-A 0 278 407, EP-A 1 178 029, FR-A 1 304 144, JP-A 30 44 340, JP-A 30 44 341, JP-A 30 44 342, JP-A 0 40 36 251, GB-A 721,540, DE-A 195 304 14, JP-A 2001/049029, U.S. Pat. No. 2,781,396, U.S. Pat. No. 3,094,564, FR-A 1 324 873, JP-A 0 816 9854, U.S. Pat. No. 3,153,673, U.S. Pat. No. 3,127,451, U.S. Pat. No. 1,828,344, WO 2003/66642, WO 2003/18912, EP-A 0 424 767, WO 2002/68369, EP-A 0 366 089, JP-A 2001/002829, DE-A 100 35 617, DE-A 199 55 593, WO 2002/00580, EP-A 0 643 031, U.S. Pat. No. 2,876,264, JP-A 2000/319444 and DE-A 100 32 580;

hydrogenation of aldol products, for example as disclosed in DE-A 102 51 311, JP-A 05 194 761, U.S. Pat. No. 3,272,873, DE-A 3 151 086, JP-A 2001/322959, WO 98/03462 and EP-A 0 603 630;

hydration of alkenes, for example as disclosed in U.S. Pat. No. 5,136,108, EP-A 0 325 144, EP-A 0 325 143, DE-A 100 50 627, U.S. Pat. No. 4,982,022, GB-A 2,187,741, DE-A 36 28 008, U.S. Pat. No. 3,277,191, JP-A 2000/191 566, DE-A 854 377, DE-A 38 01 275, DE-A 39 25 217, JP-A 06 321 828, JP-A 02 088 536, JP-A 06 287 156, JP-A 06 287 155, JP-A 54 141 712, JP-A 08 283 186, JP-A 09 263 558 and U.S. Pat. No. 4,684,751;

hydrogenation of carboxylic acids and carboxylic esters, in particular fatty acids and fatty acid esters, for example as disclosed in U.S. Pat. No. 5,463,143, U.S. Pat. No. 5,475,159, WO 94/10112, CA 2,314,690, WO 94/06738, JP-A 06 065 125 and U.S. Pat. No. 3,361,832;

hydrogenation of unsaturated alcohols or of carbonyl compounds, for example as disclosed in EP-A 0 394 842, DE-A 1 269 605, WO 88/05767, FR-A 1,595,013, EP-A 0 326 674, BE-A 756 877, BE-A 757 561, DE-A 1 277 232, FR-A 1,499,041 and DE-A 1 276 620;

hydrogenation of epoxides, for example as disclosed in FR-A 1,508,939, GB-A 879 803 and DE-A 1 078 106;

process comprising a telomerization step, for example as disclosed in EP-A 0 330 999, DE-A 1 138 751, U.S. Pat. No. 5,908,807, NE-6,603,884 and U.S. Pat. No. 3,091, 628, process comprising an isomerizatin step, for example as disclosed in DE-A 42 28 887;

hydrolysis of sulphates, for example as disclosed in GB-A 1,165,309;

reaction of dienes with amines, for example as disclosed in DE-A 44 31 528;

enzymatic preparation of alcohols, for example as disclosed in WO 93/24644;

selective hydrogenation of dienes, for example as disclosed in U.S. Pat. No. 3,203,998, DE-A 21 41 186, GB-A 2,093,025, JP-A 02 129 24, JP-A 1 122 8468, DE-A 195 44 133, WO 94/00410, GB-A 2,260,136, DE-A 44 10 746 and

JP-A 08 176 036;

preparation of alcohols from nitriles, for example as disclosed in EP-A 0 271 092;

preparation of alcohols by reaction of alkynes, for example as disclosed in RU 205 9597-C1; and hydrogenolysis of substituted tetrahydropyrans, for example as disclosed in GB 1,320,188.

Further processes for the preparation of alcohols which can likewise be used for the preparation of alcohols or alcohol mixtures suitable for the esterification with benzenepolycarboxylic acids are known to the person skilled in the art. Preferably used alcohols are—as mentioned above—alcohols which have $C_1$-$C_{13}$-alkyl radicals. In particular, the relatively long-chain $C_5$-$C_{13}$-alcohols or alcohol mixtures which contain these alcohols are particularly preferably prepared by catalytic hydroformylation (also referred to as oxoreaction) of olefins and subsequent hydrogenation of the aldehydes formed. Suitable hydroformylation processes are known to the person skilled in the art and are disclosed in the abovementioned documents. Alcohols and alcohol mixtures disclosed in said documents can be reacted with the above-mentioned benzenepolycarboxylic acids to give the desired alkyl benzenepolycarboxylates or mixtures of alkyl benzenepolycarboxylates.

$C_5$-Alcohols or mixtures which contain $C_5$-alcohols, particularly preferably n-pentanol, can be prepared, for example, by hydroformylation of butadiene in the presence of an aqueous solution of a rhodium compound and of a phosphine as a catalyst. Such a process is disclosed, for example, in EP-A 0 643 031.

Suitable $C_7$-alcohol mixtures which can be used for the esterification with the benzenepolycarboxylic acids are disclosed, for example, in JP-A 2000/319 444. The preparation of the $C_7$-alcohol mixture is effected by hydroformylation with subsequent hydrogenation of the aldehydes formed.

Mixtures containing $C_8$-alcohols and their preparation processes are disclosed, for example, in GB-A 721 540, in which a process for the preparation of isooctyl alcohols starting from heptenes by means of hydroformylation and subsequent hydrogenation is described. Further documents which disclose the preparation of $C_7$-alcohols or mixtures containing these alcohols are DE-A 195 30 414, JP-A 2001/49029, U.S. Pat. No. 2,781,396, U.S. Pat. No. 3,094,564, FR-A 1,324,873, JP-A 08 169 854, U.S. Pat. No. 3,153,673, U.S. Pat. No. 3,127,451 and U.S. Pat. No. 1,828,344.

$C_9$-Alcohols or mixtures containing $C_9$-alcohols are preferably prepared by dimerization of butenes, hydroformylation of the octenes obtained and subsequent hydrogenation of the $C_9$-aldehyde obtained.

Suitable processes and mixtures containing $C_9$-alcohols are disclosed, for example, in WO 92/13818, DE-A 20 09 505, DE-A 199 24 339, EP-A 1 113 034, WO 2000/63151, WO 99/25668, JP-A 1 160 928, JP-A 03 083 935, JP-A 2000/053803, EP-A 0 278 407 and EP-A 1 178 029.

$C_{10}$-Alcohols and mixtures containing these alcohols are disclosed, for example, in WO 2003/66642, WO 2003/18912, EP-A 0 424 767, WO 2002/68369, EP-A 0 366 089 and JP-A 2001/002829.

$C_{12}$-Alcohols or mixtures containing $C_{12}$-alcohols, in particular trimethylnonanol, and a process for the preparation thereof are disclosed, for example, in WO 98/03462.

$C_{13}$-Alcohols and mixtures containing these alcohols are disclosed, for example, in DE-A 100 32 580, DE-A 199 55 593 and WO 2002/00580.

Particularly preferably, dialkyl esters of the abovementioned cyclohexanedicarboxylic acids, in particular 1,2-, 1,3- or 1,4-dialkyl esters and very particularly preferably 1,2-dialkyl esters, are used in the auxiliaries or as auxiliaries according to the present application. It is possible to use dialkyl esters in which both ester groups of the dialkyl esters carry the same alkyl radicals, and ester groups in which the two ester groups of the dialkyl esters carry different alkyl groups. Examples of mixed and non-mixed alkyl esters of the cyclohexanedicarboxylic acids have already been mentioned above. Furthermore, it is possible that the alkyl groups of the alkyl cyclohexanedicarboxylates have the same number of carbon atoms but are straight-chain or have different branches and hence form isomer mixtures. Such isomer mixtures can also be used if the number of carbon atoms of the alkyl groups of the dialkyl esters is different. The proportion of the different isomers of the alkyl groups arises in general from the composition of the alcohols which are used for the esterification of the benzenedicarboxylic acids, which are hydrogenated to give the cyclohexanedicarboxylic esters after esterification. Suitable alcohol mixtures have already been mentioned above. In the context of the present application, straight-chain or branched alkyl radicals having a certain number of carbon atoms are therefore to be understood as meaning not only the respective individual isomers but also isomer mixtures whose composition—as mentioned above—arises from the composition of the alcohols used for the esterification of the benzenedicarboxylic acids. In the context of the present application, straight-chain alkyl radicals are to be understood as meaning exclusively straight-chain alkyl radicals, but also mixtures of alkyl radicals which are predominantly straight-chain.

If the alkyl radicals R of the cyclohexanepolycarboxylic esters are $C_1$- to $C_4$-alkyl radicals, these are obtained by reaction of the benzenepolycarboxylic acids of the formula II with methanol, ethanol, n-propanol, isopropanol, n-butanol, isobutanol, sec-butanol or tert-butanol. In each case mixtures of said propanols or butanols or individual isomers can be used for the preparation of benzenepolycarboxylic esters in which R is 3 or 4. Individual isomers of propanol or of butanol are preferably used. The preparation of the abovementioned $C_1$- to $C_4$-alcohols is known to the person skilled in the art.

If the alkyl radicals R of the cyclohexanepolycarboxylic esters are $C_5$- to $C_{13}$-alkyl radicals, $C_5$- to $C_{13}$-alcohols are preferably used which have degrees of branching (ISO index) of in general 0.10 to 4, preferably 0.5 to 3, particularly preferably 0.8 to 2 and in particular 1 to 1.5, i.e. in general the respective alcohols are mixtures of different isomers. Very particularly preferably, $C_9$-alcohol mixtures having an ISO index of 1 to 1.5, in particular nonanol mixtures having an ISO index of 1.25 or 1.6, are used. The ISO index is a dimensional quantity which was determined by means of gas chromatography.

Method: Capillary GC
Apparatus: Capillary gas chromatograph with autosampler, split/splitless injection system and flame ionization detector (FID)
Chemicals: MSTFA (N-methyl-N-trimethylsilyltrifluoroacetamide)
Comparisons for determination of the retention times
Sample preparation: 3 drops of the sample are kept in 1 ml of MSTFA and for 60 minutes at 80° C.
GC conditions: Capillary column: Ultra-1
length: 50 m
Internal diameter: 0.25 mm
Film thickness: 0.1 micron
Carrier gass: helium
Column admission pressure: 200 psi constant
Split: 80 ml/min
Septum flushing: 3 ml/min
Oven temperature: 120° C., 25 min isothermal
Injector temperature: 250° C.
Detector temperature: 250° C. (FID)
Injection volume: 0.5 microlitre
Calculation The procedure for the calculation of the ISO index is shown in the following table:

| Component | Name | Branching | Proportion in area % | Index |
|---|---|---|---|---|
| 1 | 2-Ethyl-2-methylhexan-1-ol | 2 | 1.00 | 0.0200 |
| 2 | 2-Ethyl-4-methylhexan-1-ol | 2 | 1.00 | 0.0200 |
| 3 | 2-Ethyl-4-methylhexan-1-ol | 2 | 1.00 | 0.0200 |
| 4 | 2-Propyl-3-methylpentan-1-ol | 2 | 1.00 | 0.0200 |
| 5 | 2-Propyl-hexan-1-ol | 1 | 1.00 | 0.0100 |
| 6 | 2,5-Dimethylheptan-1-ol | 2 | 1.00 | 0.0200 |
| 7 | 2,3-Dimethylheptan-1-ol | 2 | 1.00 | 0.0200 |
| 8 | 2,3,4-Trimethylhexan-1-ol | 3 | 1.00 | 0.0300 |
| 9 | 2-Ethylheptan-1-ol | 1 | 1.00 | 0.0100 |
| 10 | 3-Ethyl-4-methylhexan-1-ol | 2 | 82.00 | 1.6400 |
| 11 | 3-Ethylheptan-1-ol | 1 | 1.00 | 0.0100 |
| 12 | 2-Methyloctan-1-ol | 1 | 1.00 | 0.0100 |
| 13 | 4,5-Dimethylheptan-1-ol | 2 | 1.00 | 0.0200 |
| 14 | 4,5-Dimethylheptan-1-ol | 2 | 1.00 | 0.0200 |
| 15 | 4-Methyloctan-1-ol | 1 | 1.00 | 0.0100 |
| 15a | 7-Methyloctan-1-ol | 1 | 1.00 | 0.0000 |
| 16 | 6-Methyloctan-1-ol | 1 | 1.00 | 0.0100 |
| 17 | Nonan-1-ol | 0 | 1.00 | 0.0000 |
| | | Total: | 99.00 | 1.9000 |
| | Unknown component | 2 | 1.00 | 0.0200 |
| | | | ISO index: | 1.9200 |

The $C_5$- to $C_{13}$-alcohols are prepared according to the abovementioned processes. For the preparation of cyclohexanepolycarboxylic esters in which R is 9, a nonanol mixture is particularly preferably used in which 0 to 20% by weight, preferably 0.5 to 18% by weight, particularly preferably 6 to 16% by weight, of the nonanol mixture have no branches, 5 to 90% by weight, preferably 10 to 80% by weight, particularly preferably 45 to 75% by weight, have one branch, 5 to 70% by weight, preferably 10 to 60% by weight, particularly preferably 15 to 35% by weight, have two branches, 0 to 10% by weight, preferably 0 to 8% by weight, particularly preferably 0 to 4% by weight, have three branches and 0 to 40% by weight, preferably 0.1 to 30% by weight, particularly preferably 0.5 to 6.5% by weight, are other components. Other components are to be understood in general as meaning nonanols having more than three branches, decanols or octanols, the sum of said components being 100% by weight.

A particularly preferred embodiment of a nonanol mixture which is employed for the preparation of preferably used cyclohexanepolycarboxylic acid derivatives has the following composition:
- 1.73 to 3.73% by weight, preferably 1.93 to 3.53% by weight, particularly preferably 2.23 to 3.23% by weight, of 3-ethyl-6-methylhexanol;
- 0.38 to 1.38% by weight, preferably 0.48 to 1.28% by weight, particularly preferably 0.58 to 1.18% by weight, of 2,6 dimethylheptanol;
- 2.78 to 4.78% by weight, preferably 2.98 to 4.58% by weight, particularly preferably 3.28 to 4.28% by weight, of 3,5-dimethylheptanol;
- 6.30 to 16.30% by weight, preferably 7.30 to 15.30% by weight, particularly preferably 8.30 to 14.30% by weight, of 3,6-dimethylheptanol;
- 5.74 to 11.74% by weight, preferably 6.24 to 11.24% by weight, particularly preferably 6.74 to 10.74% by weight, of 4,6-dimethylheptanol;
- 1.64 to 3.64% by weight, preferably 1.84 to 3.44% by weight, particularly preferably 2.14 to 3.14% by weight, of 3,4,5-trimethylhexanol;
- 1.47 to 5.47% by weight, preferably 1.97 to 4.97% by weight, particularly preferably 2.47 to 4.47% by weight, of 3,4,5-trimethylhexanol, 3-methyl-4-ethylhexanol and 3-ethyl-4-methylhexanol;
- 4.00 to 10.00% by weight, preferably 4.50 to 9.50% by weight, particularly preferably 5.00 to 9.00% by weight, of 3,4-dimethylheptanol;
- 0.99 to 2.99% by weight, preferably 1.19 to 2.79% by weight, particularly preferably 1.49 to 2.49% by weight, of 4-ethyl-5-methylhexanol and 3-ethylheptanol;
- 2.45 to 8.45% by weight, preferably 2.95 to 7.95% by weight, particularly preferably 3.45 to 7.45% by weight, of 4,5-dimethylheptanol and 3-methyloctanol;
- 1.21 to 5.21% by weight, preferably 1.71 to 4.71% by weight, particularly preferably 2.21 to 4.21% by weight, of 4,5-dimethylheptanol;
- 1.55 to 5.55% by weight, preferably 2.05 to 5.05% by weight, particularly preferably 2.55 to 4.55% by weight, of 5,6-dimethylheptanol;
- 1.63 to 3.63% by weight, preferably 1.83 to 3.43% by weight, particularly preferably 2.13 to 3.13% by weight, of 4-methyloctanol;
- 0.98 to 2.98% by weight, preferably 1.18 to 2.78% by weight, particularly preferably 1.48 to 2.48% by weight, of 5-methyloctanol;
- 0.70 to 2.70% by weight, preferably 0.90 to 2.50% by weight, particularly preferably 1.20 to 2.20% by weight, of 3,6,6-trimethylhexanol;
- 1.96 to 3.96% by weight, preferably 2.16 to 3.76% by weight, particularly preferably 2.46 to 3.46% by weight, of 7-methyloctanol;
- 1.24 to 3.24% by weight, preferably 1.44 to 3.04% by weight, particularly preferably 1.74 to 2.74% by weight, of 6-methyloctanol;
- 0.1 to 3% by weight, preferably 0.2 to 2% by weight, particularly preferably 0.3 to 1% by weight, of n-nonanol;
- 25 to 35% by weight, preferably 28 to 33% by weight, particularly preferably 29 to 32% by weight, of other alcohols having 9 and 10 carbon atoms; the total sum of said components being 100% by weight.

A further particularly preferred embodiment of a nonanol mixture which is employed for the preparation of preferably used cyclohexanepolycarboxylic acid derivatives has the following combination:
- 6.0 to 16.0% by weight, preferably 7.0 to 15.0% by weight, particularly preferably 8.0 to 14.0% by weight, of n-nonanol;
- 12.8 to 28.8% by weight, preferably 14.8 to 26.8% by weight, particularly preferably 15.8 to 25.8% by weight, of 6-methyloctanol;
- 12.5 to 28.8% by weight, preferably 14.5 to 26.5% by weight, particularly preferably 15.5 to 25.5% by weight, of 4-methyloctanol;
- 3.3 to 7.3% by weight, preferably 3.8 to 6.8% by weight, particularly preferably 4.3 to 6.3% by weight, of 2-methyloctanol;
- 5.7 to 11.7% by weight, preferably 6.3 to 11.3% by weight, particularly preferably 6.7 to 10.7% by weight, of 3-ethylheptanol;
- 1.9 to 3.9% by weight, preferably 2.1 to 3.7% by weight, particularly preferably 2.4 to 3.4% by weight, of 2-ethylheptanol;
- 1.7 to 3.7% by weight, preferably 1.9 to 3.5% by weight, particularly preferably 2.2 to 3.2% by weight, of 2-propylhexanol;
- 3.2 to 9.2% by weight, preferably 3.7 to 8.7% by weight, particularly preferably 4.2 to 8.2% by weight, of 3,5-dimethylheptanol;
- 6.0 to 16.0% by weight, preferably 7.0 to 15.0% by weight, particularly preferably 8.0 to 14.0% by weight, of 2,5-dimethylheptanol;
- 1.8 to 3.8% by weight, preferably 2.0 to 3.6% by weight, particularly preferably 2.3 to 3.3% by weight, of 2,3-dimethylheptanol;
- 0.6 to 2.6% by weight, preferably 0.8 to 2.4% by weight, particularly preferably 1.1 to 2.1% by weight, of 3-ethyl-4-methylhexanol;
- 2.0 to 4.0% by weight, preferably 2.2 to 3.8% by weight, particularly preferably 2.5 to 3.5% by weight, of 2-ethyl-4-methylhexanol;
- 0.5 to 6.5% by weight, preferably 1.5 to 6% by weight, particularly preferably 1.5 to 5.5% by weight, of other alcohols having 9 carbon atoms;

the total sum of said components being 100% by weight.

The present invention furthermore relates to cyclohexanepolycarboxylic esters which can be prepared by a process comprising the steps a) esterification of a benzenepolycarboxylic acid of the formula II

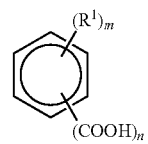

(II)

in which
$R^1$ denotes $C_1$-$C_{10}$-alkyl or $C_3$-$C_8$-cycloalkyl,
m denotes 0, 1, 2 or 3, and
n denotes 2, 3 or 4,
with one or more alcohols of the formula

in which
R' denotes $C_5$-$C_{13}$-alkyl,
the alkyl radicals R' having degrees of branching of 0.1 to 4, preferably 0.5 to 3, particularly preferably 0.8 to 2, very particularly preferably 1 to 1.5 (ISO index),
a benzenepolycarboxylic ester of the formula III'

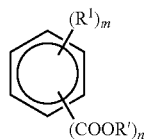

being obtained,
b) hydrogenation of the benzenepolycarboxylic ester of the formula III' to give a corresponding cyclohexanepolycarboxylic acid.

Preferred alcohols R'—OH, in particular nonanol mixtures, are the above-mentioned alcohols and alcohol mixtures. Preferred embodiments of $R^1$, m and n are mentioned above with regard to the cyclohexanepolycarboxylic esters according to formula I.

The cyclohexanepolycarboxylic esters according to the invention are particularly suitable as a dust-reducing component in construction chemistry products.

The invention furthermore relates to pulverulent construction chemistry products having reduced dust formation behaviour, containing at least one cyclohexanepolycarboxylic acid derivative of the formula (I) or a mixture thereof, further customary ingredients or constituents, such as, for example, hardening accelerators, sulphate carriers, antifoams, etc. These products are distinguished in an advantageous manner by a proportion of latently hydraulically setting and/or hydraulically setting components in the range of 10 to 90% by weight, preferably 20 to 60% by weight, based in each case on the total composition.

The present invention furthermore comprises a corresponding pulverulent construction chemistry product which is a lime- and/or gypsum- and/or cement-containing mortar. According to an additional variant, this product is a mortar, such as, for example, tile adhesive, grout, repair mortar, or reinforcing mortar or comprises filling compounds, sealing slurries, adhesive slurries, screeds or renders.

The concomitantly claimed pulverulent construction chemistry product based on a cyclohexanepolycarboxylic acid derivative may be in particular a mortar which contains at least one alkali-activated latently hydraulic component which is, for example, a geopolymer binder or waterglass based binder. Geopolymers are relatively novel mineral building materials which have fire and acid resistance as typical properties and moreover possess advantageous ecological properties. Chemically, geopolymers are based on aluminosilicates and they are substantially polysilico-oxo-aluminates.

The cyclohexanepolycarboxylic acid derivatives according to the invention and cyclohexanepolycarboxylic acid derivatives obtainable by the process according to the invention are substantially free of natural odours and have an extremely broad liquid range (at least from −70 to +200° C.).

The amount of the cyclohexanepolycarboxylic acid derivatives used as dedusting additives, based on the construction chemistry products to be dedusted, is 0.01 to 10% by weight, preferably 0.1 to 3% by weight and particularly preferably 0.2 to 1.0% by weight.

The invention furthermore relates to a process for the preparation of pulverulent construction chemistry products having a reduced dust formation behaviour, containing the cyclohexanepolycarboxylic acid derivatives of the formula (I) according to the invention.

The cyclohexanepolycarboxylic acid derivatives are brought into contact or treated with the construction chemistry product. In general, this is effected by spraying ("atomizing") the dedusting additives as defined above onto the construction chemistry products. The treatment or the bringing into contact of the dedusting additives used according to the invention with the construction chemistry products to be dedusted can, however, also be effected in any other suitable manner which is familiar to the person skilled in the art, for example mixing of the construction chemistry products to be dedusted with the liquid dedusting additives. According to the invention, however, a spray application of the liquid dedusting additives is preferred because this is the simplest and most economical variant for the treatment of the products to be dedusted.

Individual components to which dedusting agents are added can even serve as carriers for the dedusting of further formulation components (e.g. cement). On addition of 2.2% of dedusting agent to 5 g of polymer powder (Acronal® S695P, BASF), for example, 35 g of Portland cement (CEM 142.5) can be dedusted. Here, it is sufficient if the "impregnated" polymer powder is simply mixed with the cement.

The possibility of using previously dedusted components by simple admixing in its plant and of thus dedusting the total dry mixture is therefore open to the industrial user. Complicated process modifications are dispensed with thereby.

Owing to the low viscosity and good distribution of the product, simple metering in of the dedusting agent in the process is also possible.

As described above, the cyclohexanepolycarboxylic acid derivatives used according to the invention, when they are used as dedusting additives for dry, pulverulent construction chemistry products, lead to a substantial minimization of dust release in the case of these products.

This effect can be even further increased if the additives according to the invention are used in combination with further suitable additives known from the prior art, for example fibres, such as polyethylene or polypropylene fibres, which achieve a dedusting effect.

The invention is explained in more detail with reference to the following, nonlimiting examples.

EXAMPLES

The dry mortar mixes (tile adhesive 1, tile adhesive 2, grout, self-levelling filling compound and flexible sealing slurry) mentioned below were obtained by a procedure in which the respective individual components had been weighed into a mixing container and had then been homogeneously mixed with the aid of a drill with attached disc stirrer.
1. Dry Mortar Mixes:

| 1.1 Tile adhesive 1 | |
| --- | --- |
| Portland cement CEM I | 60.5% by weight |
| Quartz sand 0.1-0.5 mm | 23.6% by weight |
| Ground limestone <0.1 mm | 10.5% by weight |
| Cellulose ether | 1.9% by weight |
| Dispersion powder | 3.0% by weight |
| Hardening accelerator | 0.5% by weight |

-continued

1.2 Tile adhesive 2

| | |
|---|---|
| Portland cement CEM I | 38.0% by weight |
| Quartz sand 0.1-0.5 mm | 51.5% by weight |
| Ground limestone <0.1 mm | 5.0% by weight |
| Cellulose ether | 1.0% by weight |
| Dispersion powder | 4.0% by weight |
| Hardening accelerator | 0.5% by weight |

1.3 Grout

| | |
|---|---|
| Portland cement CEM I | 36.5% by weight |
| Quartz sand 0.1-0.2 mm | 51.8% by weight |
| Ground limestone <0.1 mm | 8.0% by weight |
| Powdered pigment | 2.2% by weight |
| Dispersion powder | 1.0% by weight |
| Hardening accelerator | 0.5% by weight |

1.4 Self-levelling filling compound

| | |
|---|---|
| Portland cement CEM III | 6.5% by weight |
| High-alumina cement | 12.0% by weight |
| Quartz sand 0.03-0.1 mm | 32.5% by weight |
| Ground limestone <0.1 mm | 42.3% by weight |
| Levelling agent | 0.1% by weight |
| Sulphate carrier | 5.0% by weight |
| Dispersion powder | 1.0% by weight |
| Antifoamer | 0.1% by weight |
| Hardening accelerator | 0.5% by weight |

1.5 Flexible sealing slurry

| | |
|---|---|
| Portland cement CEM I | 13.5% by weight |
| Quartz sand 0.01-0.2 mm | 55.5% by weight |
| Ground limestone <0.1 mm | 5.5% by weight |
| Dispersion powder | 25.0% by weight |
| Hardening accelerator | 0.5% by weight |

2. Dedusting of a Dry Mortar Mix

2.1 Sample Preparation:

The respective dry mortar mixes according to formulations 1.1 to 1.5 were initially introduced into a mixing vessel. The dedusting additive according to the invention (Hexamoll DINCH from BASF SE) was applied in the stated ratio to the respective dry mortar mix by means of a pressure spray ("flower spray") and mixed with the dry mortar.

2.2 Method of Measurement:

The measurements were carried out on the basis of DIN 55999-2 "Determination of a measure for the dust development of pigments and fillers—Part 2: Dropdown method". The "SP3 dust measuring instrument" from LORENZ MESSGERÄTEBAU was used for the measurement.

2.3 Results:

| | Dust index after 0 d | Dust index after 28 d |
|---|---|---|
| Tile adhesive 1 | 160 | 160 |
| Tile adhesive 1 + 1% by weight of Hexamoll DINCH | 52 | 44 |
| Tile adhesive 1 + 2% by weight of Hexamoll DINCH | 19 | 19 |
| Tile adhesive 2 | 180 | 180 |
| Flexible mortar + 2% by weight of Hexamoll DINCH | 12 | 12 |
| Grout | 100 | 150 |
| Joint mortar + 1% by weight of Hexamoll DINCH | 30 | 72 |
| Joint mortar + 2% by weight of Hexamoll DINCH | 18 | 44 |
| Self-levelling filling compound | 100 | 150 |
| Self-levelling filling compound + 2% by weight of Hexamoll DINCH | 7 | 4 |
| Flexible sealing slurry | 443 | 450 |
| Flexible coating slurry + 3% by weight of Hexamoll DINCH | 95 | 140 |

3. Dedusting of Individual Components:

3.1 Sample Preparation:

The respective dispersion powder was initially introduced into a mixing vessel. The dedusting additive according to the invention (Hexamoll DINCH from BASF SE) was applied in the stated ratio to the individual component by means of a pressure spray ("flower spray") and homogeneously mixed.

3.2 Method of Measurement:

The measurements were carried out on the basis of DIN 55999-2 "Determination of a measure for the dust development of pigments and fillers—Part 2: Dropdown method". The "SP3 dust measuring instrument" from LORENZ MESSGERÄTEBAU was used for the measurement.

3.3 Results:

| | Dust index after 0 d | Dust index after 28 d |
|---|---|---|
| Acronal S695P dispersion powder | 670 | 700 |
| Acronal S695P dispersion powder + 3% by weight of Hexamoll DINCH | 200 | 230 |
| Acronal S629P dispersion powder | 650 | 630 |
| Acronal S629P dispersion powder + 3% by weight of Hexamoll DINCH | 230 | 250 |
| Acronal S631P dispersion powder | 700 | 710 |
| Acronal S631P dispersion powder + 3% by weight of Hexamoll DINCH | 210 | 220 |

The invention clamied is:

1. A process for the use of mono-, di-, tri-, and/or tetraesters, and/or anhydrides of cyclohexanepolycarboxylic acid of the formula (I)

(I)

in which
R$^1$ represents C$_1$-C$_{10}$-alkyl or C$_3$-C$_8$-cycloalkyl,
m represents 0, 1, 2 or 3,
n represents 2, 3 or 4 and
R represents C$_1$-C$_{30}$-alkyl, C$_1$-C$_{30}$-alkoxy or C$_3$-C$_8$-cycloalkyl, as an additive for dedusting pulverulent hydraulically setting gypsum- or cement-containing products, comprising bringing a pulverulent hydraulically setting gypsum- or cement-containing product, an individual constituent or component thereof, or mixtures thereof, into contact with or treating with at least one mono-, di-, tri-, and/or tetraester, and/or anhydride of cyclohexanepolycarboxylic acid of formula (I).

2. The process according to claim 1 wherein the mono-, di-, tri-, and/or tetraester, and/or anhydride of cyclohexanepolycarboxylic acid is used as an additive for dedusting organic constituents of the pulverulent hydraulically setting gypsum- or cement-containing product.

3. The process according to claim 1 wherein the mono-, di-, tri-, and/or tetraester, and/or anhydride of cyclohexanepolycarboxylic acid is used as an additive for dedusting mineral constituents of the pulverulent hydraulically setting gypsum- or cement-containing product.

4. The process according to claim 1 wherein the radicals R$^1$ are identical or different if m is 2 or 3.

5. The process according to claim 1 wherein the $C_1$-$C_{10}$-alkyl groups are straight-chain or branched.

6. The process according to claim 1 wherein $R^1$ is a $C_1$-$C_8$-alkyl group.

7. The process according to claim 1 wherein the radicals R are identical or different, the $C_1$-$C_{30}$-alkyl groups and the alkyl radicals of the $C_1$-$C_{30}$-alkoxy groups being straight-chain or branched.

8. The process according to claim 1 wherein R represents $C_1$-$C_{30}$-alkyl.

9. The process according to claim 1 wherein R represents methyl, ethyl, n-propyl, isopropyl, n-butyl, isobutyl, sec-butyl, tert-butyl, n-pentyl, n-hexyl, n-octyl and 2-ethylhexyl, n-nonyl, isononyl, n-decyl, isodecyl, n-undecyl, isoundecyl, n-dodecyl, isododecyl, n-tridecyl, isotridecyl, stearyl and/or n-eicosyl.

10. The process according to claim 1 wherein the alkyl groups are in each case individual isomers of said alkyl groups or are mixtures of different alkyl groups.

11. The process according to claim 1, wherein the esters used are selected from the group consisting of alkyl, cycloalkyl and alkoxyalkyl esters.

12. The process according to claim 1 wherein at least one of the mono-, di-, tri-, and/or tetraesters, and/or anhydrides of cyclohexanepolycarboxylic acid is selected from the group consisting of mono- and/or dialkyl esters of phthalic acid, isophthalic acid and/or terephthalic acid, which esters are hydrogenated on the nucleus, mono-, di- and/or trialkyl esters of trimellitic acid, which esters are hydrogenated on the nucleus, trimesic acid and/or hemimellitic acid and mono-, di-, tri- and/or tetraalkyl esters of pyromellitic acid.

13. The process according to claim 1 wherein the mono-, di-, tri-, and/or tetraesters, and/or anhydrides of cyclohexanepolycarboxylic acid are prepared by a) esterification of a benzenepolycarboxylic acid of the formula II

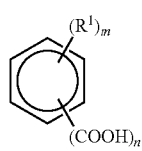

(II)

in which
$R^1$ denotes $C_1$-$C_{10}$-alkyl or $C_3$-$C_8$-cycloalkyl,
m denotes 0, 1, 2 or 3 and
n denotes 2, 3 or 4,
with one or more alcohols of the formula

R—OH in which
R denotes $C_1$-$C_{30}$-alkyl,
a benzenepolycarboxylic ester of the formula III being obtained

(III)

b) hydrogenation of the benzenepolycarboxylic ester of the formula III to give a corresponding cyclohexanepolycarboxylic ester.

14. The process according to claim 13, wherein the benzenepolycarboxylic acid used is phthalic acid, isophthalic acid, terephthalic acid, trimellitic acid, trimesic acid, hemimellitic acid and/or pyromellitic acid.

15. The process according to claim 13 wherein the alcohols are linear or branched alcohols having $C_1$-$C_{13}$-alkyl radicals.

16. The process according to claim 1 wherein the mono-, di-, tri-, and/or tetraesters, and/or anhydrides of cyclohexanepolycarboxylic acid are esters which are prepared by a process comprising a) esterification of a benzenepolycarboxylic acid of the formula II

(II)

in which
$R^1$ denotes $C_1$-$C_{10}$-alkyl or $C_3$-$C_8$-cycloalkyl,
m denotes 0, 1, 2 or 3 and
n denotes 2, 3 or 4,
with one or more alcohols of the formula

R'—OH in which
R' denotes $C_5$-$C_{13}$-alkyl,
the alkyl radicals R' having degrees of branching of 0.1 to 4 (ISO Index),
a benzenepolycarboxylic ester of the formula III' being obtained

(III')

b) hydrogenation of the benzenepolycarboxylic ester of the formula III' to give a corresponding cyclohexanepolycarboxylic ester.

17. The process according to claim 16, wherein the alcohol R'—OH comprises nonanol mixtures.

18. The process according to claim 1 wherein the mono-, di-, tri-, and/or tetraesters, and/or anhydrides of cyclohexanepolycarboxylic acid are used in amounts of 0.01 to 10.0% by weight, based in each case on the pulverulent hydraulically setting gypsum- or cement-containing product to be dedusted.

19. The process according to claim 1 wherein an individual pulverulent hydraulically setting gypsum- or cement-containing product component with which the mono-, di-, tri-, and/or tetraester, and/or anhydride of cyclohexanepolycarboxylic acid is contacted or treated serves as carrier material for dedusting further formulation components.

20. The process according to claim 1, wherein the pulverulent hydraulically setting gypsum- or cement-containing product comprises a gypsum- and/or cement-containing mortar.

* * * * *